(12) United States Patent
Nakano et al.

(10) Patent No.: US 12,539,533 B2
(45) Date of Patent: Feb. 3, 2026

(54) METHOD AND APPARATUS FOR MANUFACTURING METAL PIPE

(71) Applicant: NAKATA MANUFACTURING CO., LTD., Osaka (JP)

(72) Inventors: Tomoyasu Nakano, Osaka (JP); Takeyuki Sato, Osaka (JP); Jilong Yin, Osaka (JP); Feizhou Wang, Osaka (JP); Shunichi Haruyama, Osaka (JP)

(73) Assignee: NAKATA MANUFACTURING CO., LTD., Osaka (JP)

( * ) Notice: Subject to any disclaimer, the term of this patent is extended or adjusted under 35 U.S.C. 154(b) by 427 days.

(21) Appl. No.: 17/995,821

(22) PCT Filed: Apr. 8, 2021

(86) PCT No.: PCT/JP2021/014863
§ 371 (c)(1),
(2) Date: Oct. 7, 2022

(87) PCT Pub. No.: WO2021/206134
PCT Pub. Date: Oct. 14, 2021

(65) Prior Publication Data
US 2023/0145306 A1    May 11, 2023

(30) Foreign Application Priority Data

Apr. 9, 2020  (JP) ................................ 2020-070224
Jul. 31, 2020  (JP) ................................ 2020-130668

(51) Int. Cl.
*B21C 31/00* (2006.01)
*B21C 37/08* (2006.01)
(Continued)

(52) U.S. Cl.
CPC .......... *B21C 31/00* (2013.01); *B21C 37/0822* (2013.01); *B21C 37/30* (2013.01); *G05B 19/19* (2013.01)

(58) Field of Classification Search
CPC ..... B21C 37/0822; B21C 37/30; B21C 19/19; B21C 13/0265; G05B 19/19;
(Continued)

(56) References Cited

U.S. PATENT DOCUMENTS 9,446,473 B2 *  9/2016  Hasegawa ............... B21C 37/08
9,533,335 B2 *  1/2017  Della Vedova ......... B21B 31/02
(Continued)

FOREIGN PATENT DOCUMENTS

JP    S60-257923 A    12/1985
JP    S62-40087 B2    8/1987
(Continued)

OTHER PUBLICATIONS

International Search Report issued in PCT/JP2021/014863; mailed Jun. 29, 2021.

*Primary Examiner* — Ronald D Hartman, Jr.
(74) *Attorney, Agent, or Firm* — Studebaker Brackett PLLC

(57) ABSTRACT

In a method for manufacturing a metal pipe from a metal plate using a forming tool, the position of the tool is optimized simply and correctly by incorporating individuality of the raw material plate into setting of the tool position.

As a preparatory stage, a forming process is analyzed by simulation for each plate. Based on result of the analysis, correlation between a deformed shape value of a raw pipe and tool position information is acquired. Then, the forming process for each plate is stored as correlation between the deformed shape value of the raw pipe and the tool position
(Continued)

information. During pipe manufacturing, a deformed shape value of the raw pipe is measured actually while a plate is passed. On the basis of the actually measured deformed shape value, a forming process for the raw pipe is expected and assumed (by using the correlation). Tool position information necessary for implementing the expected and assumed forming process is retrieved from the stored correlation. The retrieved tool position information is realized at a stand array.

13 Claims, 18 Drawing Sheets

(51) Int. Cl.
    *B21C 37/30*     (2006.01)
    *G05B 19/19*     (2006.01)

(58) Field of Classification Search
    CPC ..... G05B 13/0265; B21B 17/04; B21B 37/00; B21B 37/78; B21B 38/00
    USPC ......................................................... 700/159
    See application file for complete search history.

(56) References Cited

U.S. PATENT DOCUMENTS

| | | | | |
|---|---|---|---|---|
| 9,884,355 | B2* | 2/2018 | Yamane | ............... B21B 25/02 |
| 2015/0121982 | A1* | 5/2015 | Yamane | ............... B21B 25/02 |
| | | | | 72/462 |

FOREIGN PATENT DOCUMENTS

| | | | |
|---|---|---|---|
| JP | H07-275954 | A | 10/1995 |
| JP | 4780952 | B2 | 9/2011 |
| JP | 4906986 | B2 | 3/2012 |
| JP | 5057467 | B2 | 10/2012 |
| JP | 5268834 | B2 | 8/2013 |
| JP | 5523579 | B2 | 6/2014 |
| JP | 5631337 | B2 | 11/2014 |
| JP | 5781821 | B2 | 9/2015 |
| JP | 6159005 | B1 | 7/2017 |
| JP | 6385552 | B1 | 9/2018 |
| JP | 6823212 | B1 | 1/2021 |
| JP | 6839786 | B2 | 3/2021 |

\* cited by examiner

BD1

METHOD AND APPARATUS FOR MANUFACTURING METAL PIPE

TECHNICAL FIELD

The present invention relates to a method and an apparatus for manufacturing a metal pipe from a metal plate (strip) by forming using a forming tool such as a roll, and relates to a method and an apparatus for manufacturing a metal pipe that achieve forming while optimizing the position of a forming tool automatically to be used for the forming at the time of initial threading of a metal plate into the manufacturing apparatus or changing of the dimension of the metal plate, for example.

BACKGROUND ART

In designing a pipe mill using a forming roll in preparation for manufacture of a metal pipe, a systematic design method has yet to be established. In some cases, for example, in response to the dimension and a range thereof of a pipe to be manufactured, and the material and property of a raw plate to be used, a forming method is selected and a roll flower is selected and designed by giving consideration to the number of stages of forming roll stands and a forming amount distribution. Then, the types of the roll stands are selected further and a profile is determined for a forming roll to be used in each roll stand.

In many cases, regarding provision of a new pipe mill, the number of roll stands or a roll configuration is determined for an economic reason. This may cause deviation from an ideal forming stand configuration responsive to a selected forming method or a selected roll flower. Additionally, the pipe mill itself may encounter excess or deficiency of mechanical rigidity as a result of a configuration determined by the preference of a designer, for example. In this way, the mill is given individuality in terms of a limited caliber range of favorable forming performance, the presence of a material with which the mill achieves good or bad performance, etc.

Moreover, regarding a pipe mill in which multi-use of a forming roll is advanced, dimensions (widths, thicknesses) of forming target materials extend over a wide range and the pipe mill is designed in such a manner as to exert forming force similarly between materials of the respective dimensions. In this regard, there is also room for giving individuality to the pipe mill as a machine to work in various ways (Patent Literature 1, Patent Literature 2).

When the above-described pipe mill is installed and actual operation is started, even a material within an assumed pipe manufacturing dimensional range still differs in material property between rolling coils (in terms of dimensional accuracy, hardness and its distribution, weldability determined by a constituent, lateral bending, flatness, etc.) as a result of a place of production (steelmaking plant or factory) or a machining or thermal processing history. In this way, it can be said that the material is also given various types of individuality.

If behavior resulting from threading of a raw plate in a pipe mill is expected by conducting deformation simulation based on a three-dimensional deformation model of the raw plate through approximate physics model type analysis conventionally made, individuality of the pipe mill is incorporated in addition to the above-described individuality of the raw plate. This results in a large difference of expectation of behavior resulting from forming of a material in a line direction according to an ideal model defining constant uniformity of dimension or hardness from actual operation. Hence, the expectation based on such an ideal model becomes useless.

In response to this, in a conventional case, passage through a stand group including a breakdown BD and a cluster roll CL is managed to be made at the time of initial threading for actual operation, and adjustments are made for the positions of rolls in the stand group including BD and CL, a roll gap, increase or reduction in driving force, etc. by relying on the experience and intuition of an operator so as to allow forming into a round pipe at a stand group of final fin-pass rolls FP arranged in multiple stages.

Generally, the appropriateness of such roll adjustment is determined by a method using management of a pipe peripheral length. At the time of the initial threading, an outer peripheral length is measured by a human with steel tape at an entry side and an exit side of a stand after the fin-pass roll stand, and it is determined whether the measured length is within an outer peripheral length range of an intended product (Patent Literature 3).

The stand group including BD and CL adjusted for the above-described threading is effective in a case where a rolling coil having similar individuality is used as a raw plate. If a rolling coil to be used differs in a place of production and a machining history, however, the above-described adjustment by an operator is required to be made again at the time of initial threading.

In recent years, a forming simulator, roll flower design, and analysis and design techniques for pass schedule using a finite element method have been developed and used in reconsidering or correcting actual operation. However, adjustment by an operator is still indispensable for operation such as initial threading after roll changing necessitated by change in product dimension including the above-described initial threading.

In relation to a method for manufacturing electric resistance welded steel pipes by roll forming, necessity of advancing automatic control over pipe mills has been proposed from 1980s. However, some pipe mills have life spans from about 30 to 50 years and are still used while being incapable of being put to automatization. While automatization has been encouraged partially at each stand in recent years, a systematic design method therefor has yet to be introduced. As an example, the above-described initial threading is still yet to be automatized at present in a mill in its entirety for the reason that an actual situation of adjustment necessitated by a combination between individuality of the raw plate and that of the mill described above is too complex, so that knowledge has yet to be found about a theory or a method by which developed analysis technique, sensor technique, tool position adjusting technique, etc. are combined with each other to become controllable in an integrated manner.

Moreover, there is also a problem that use of a lubricant indispensable for roll forming makes sensing technique useless. Specifically, a water-soluble lubricant (soluble) is used in forming from a raw plate into a round pipe or a square pipe for the purpose of cooling overheat of a roll caused by machining heat or frictional heat, preventing the occurrence of a burn-in flaw or a biting flaw, or preventing a scar or dirt due to removed scale. This makes it difficult or impossible to do sensing using a contact, a camera, a laser beam, etc. in a pipe mill line in its entirety.

PRIOR ART LITERATURES

Patent Literatures

Patent Literature 1: Japanese Patent No. 4906986
Patent Literature 2: Japanese Patent Application Publication No. Hei 07-275954

Patent Literature 3: Japanese Examined Patent Application Publication No. Sho 62-40087
Patent Literature 4: Japanese Patent No. 5781821
Patent Literature 5: Japanese Patent No. 5631337
Patent Literature 6: Japanese Patent No. 6385552
Patent Literature 7: Japanese Patent No. 4780952
Patent Literature 8: Japanese Patent No. 5057467
Patent Literature 9: Japanese Patent No. 5268834
Patent Literature 10: Japanese Patent No. 5523579
Patent Literature 11: Japanese Patent No. 6159005
Patent Literature 12: Japanese Patent No. 6839786
Patent Literature 13: Japanese Patent No. 6823212

SUMMARY OF INVENTION

Problem to be Solved by Invention

In a pipe mill of manufacturing a metal pipe from a metal plate (strip) by forming using a forming tool such as a roll, the present invention is intended to provide a method and an apparatus for manufacturing the metal pipe that achieve forming while optimizing the position of the forming tool automatically arranged in a stand of the mill at the time of initial threading of the forming target metal plate or changing of the dimension of the metal plate necessitated by so-called dimension changing, for example.

Means of Solving Problem

In order to perform the above-described initial threading automatically over a pipe mill entirely using a forming roll, the inventors have made various examinations on the application of analysis result about forming simulation conducted using roll flower design and a three-dimensional elastoplastic deformation finite element method, for example. As a result, the inventors found that a roll position can be adjusted automatically by using the analyzed forming process unique to a forming target steel plate as correlation between a sectional shape of the material at the position of a certain forming roll stand and a forming roll position, for example.

The inventors noted that, in a pipe mill with forming roll stands all having configurations identified as a result of designing a certain roll flower, result of forming simulation analysis of analyzing all forming processes for a certain forming target steel plate as an ideal model defined by all forming rolls in the mill using a three-dimensional elastoplastic deformation finite element method, for example, may be grasped as correlation between a deformed shape value (material sectional shape, for example) of an entire strip-shaped material extending continuously from an entry guide stand EG to a Turk's head stand TH and positional information about each roll at all the forming roll stands from the entry guide stand EG to the Turk's head stand TH.

Furthermore, the inventors have found that, if a forming process for an integrated object formed from a plate-like shape into a pipe shape acquired from forming simulation analysis on a metal plate having a certain type, a dimension, and a history is given correlation determined by a difference in dimension of this material between a material sectional shape and a roll position and if this correlation is evaluated as a deformed shape value (an edge position, a width dimension, a height dimension as a sectional shape, for example) of the forming target material at a measurement position in the pipe mill, it becomes possible to obtain ideal roll positions of forming rolls in front of and behind the measurement position on the basis of the correlation, thereby completing the present invention.

In other words, the inventors noted that, in response to individuality of a forming target material, specifically, individuality unique to a metal plate to be used such as dimensional error, a hot rolling history, a material difference, or fluctuation in a line direction of the metal plate, an actual forming process applied during forming in a pipe mill having a predetermined configuration can be determined to differ from that according to an ideal model defining a forming process for an ideal metal plate by giving consideration to individuality of the pipe mill. Then, the inventors found that, by measuring a difference between a model during actual operation and the ideal model as a deformed shape value of the metal plate being formed and by making comparison and expectation of expecting that adjustment of the position of a forming tool will become necessary as a result of the difference in forming process from the ideal model, it becomes possible to select a forming tool required for realizing a forming process unique to a metal plate during operation and to adjust the position of the selected forming tool, thereby completing the present invention.

The present invention is intended for a manufacturing method for a metal pipe for forming a metal plate into a metal pipe through a pipe manufacturing step, a welding step, and a sizing/reshaping step performed using forming tools, characterized in that the manufacturing method uses:
a stand array line having a configuration in which some or each of the forming tools used in each of the steps is held in a corresponding stand across position adjusting means allowing position adjustment of the forming tool relative to a forming target metal plate (raw plate/raw pipe);
storage means, after implementation of a step targeted for part or whole of the stand array line of conducting simulation analysis in advance on forming processes of forming from the metal plate into the metal pipe using the forming tool on the basis of different dimensions or types of various metal plates, and after implementation of a step of acquiring data about a correlation value at each or a particular forming tool stand in the line targeted for the analysis between a deformed shape value of the raw pipe in the vicinity of the stand or in the vicinity of the forming tool and positional information about the forming tool in each stand on the basis of result of the simulation analysis on the various types of forming processes, the storage means storing the various types of forming processes in advance as data about a correlation value according to various types of ideal models between a deformed shape value of the raw pipe and a forming tool position; and
output means, by using calculation means that makes comparison with the data in the storage means and expects a forming process for the raw pipe on the basis of a deformed shape value of the raw pipe being formed that is measured together with information about the dimension or about the dimension and type of the forming target metal plate through a step of measuring a deformed shape value of the raw pipe being formed using a measurement sensor during implementation of the analysis on the target, the output means assuming a forming process unique to the raw pipe during implementation of the analysis on the target, selecting positional information about a forming tool necessary for the assumed forming process, and outputting positional information about a forming tool in the stand required to be adjusted in position; and line automatic control means that displays the positional information, for example, to encourage an operator to perform operation or controls the position adjusting means for position adjustment of the forming tool in the stand required to be adjusted in position in response to output of the positional information about the forming tool.

In the above-described manufacturing method, the present invention is intended for a manufacturing method for a metal pipe, wherein pipe manufacturing is started after a mechanical descaling process is performed on any of an entire surface, an outer peripheral intended surface, and an inner peripheral intended surface, or part of these surfaces of the metal plate as a raw material before forming, and during a step of the pipe manufacturing, lubrication of spraying a lubricant partially onto the metal plate or the forming tool is performed in response to need without using a lubricant.

In the above-described manufacturing method, the present invention is intended for a manufacturing method for a metal pipe, wherein a three-dimensional elastoplastic FEM analysis method is used in the simulation analysis.

In the above-described manufacturing method, the present invention is intended for a manufacturing method for a metal pipe, wherein the deformed shape value of the raw pipe is at least any one of an outer peripheral surface shape, an inner peripheral surface shape, a vertical sectional shape, an outer peripheral length, and forming load at each stand in the forming tool stand array.

In the above-described manufacturing method, the present invention is intended for a manufacturing method for a metal pipe, wherein while a pass line (x-axis direction) as a horizontal plane covering a traveling direction (z-axis direction) of the raw pipe set in advance and a line center (y-axis direction) as a plane vertical to the pass line are defined, the deformed shape value of the raw pipe is an outer peripheral surface shape or an inner peripheral surface shape, or also a shape defined by incorporating forming load into the inner and outer peripheral surface shapes acquired from opposite edge positions and a width dimension of the raw pipe observed on the pass line plane and a height of the raw pipe observed on the line center plane.

In the above-described manufacturing method, the present invention is intended for a manufacturing method for a metal pipe, wherein while a pass line (x-axis direction) as a horizontal plane covering a traveling direction (z-axis direction) of the raw pipe set in advance and a line center (y-axis direction) as a plane vertical to the pass line are defined, the deformed shape value of the raw pipe is a vertical sectional shape or also a shape defined by incorporating forming load into the vertical sectional shape acquired from opposite edge positions and a width dimension of the raw pipe observed on the pass line plane and a height of the raw pipe observed on the line center plane.

In the above-described manufacturing method, the present invention is intended for a manufacturing method for a metal pipe, wherein the calculation means, which makes comparison with the data in the storage means and expects the forming process for the raw pipe on the basis of the measured deformed shape value of the raw pipe being formed, calculates a correction model prepared for the raw pipe subjected to the assumed unique forming process and containing data about a correlation value between a deformed shape value necessary for making approximation to data about a correlation value according to an approximate ideal model and positional information about the forming tool, and uses line automatic control means that adjusts the position of a forming tool in a stand required to be adjusted in position.

In the above-described manufacturing method, the present invention is intended for a manufacturing method for a metal pipe, wherein the correction model is calculated by a method using machine learning technique.

In the above-described manufacturing method, the present invention is intended for a manufacturing method for a metal pipe, wherein the correction model is calculated by a method using deep learning technique.

In the above-described manufacturing method, the present invention is intended for a manufacturing method for a metal pipe, wherein the data about the correlation value between the deformed shape value and the positional information about the forming tool contained in the correction model calculated by the calculation means is stored in a storage device as data about a correlation value of a learned model relating to a metal plate of an additional unique dimension or also of an additional unique type and is used as stored data.

The present invention is intended for a manufacturing apparatus for a metal pipe for forming a metal plate into a metal pipe through a pipe manufacturing step, a welding step, and a sizing/reshaping step performed using a forming tool, the manufacturing apparatus comprising:

a stand array line having a configuration in which the forming tool used in each of the steps is held in a stand across position adjusting means that makes position adjustment of the forming tool relative to a forming target metal plate (raw pipe);

storage means that stores various types of forming processes in advance as data about a correlation value according to various types of ideal models between a deformed shape value of the raw pipe and a forming tool position, the various types of forming processes being determined on the basis of result of analysis conducted in advance through simulation analysis on a forming process of forming from the metal plate into the metal pipe using the forming tool and by acquiring a deformed shape value of the raw pipe and positional information about the forming tool at each or a particular forming tool stand based on different dimensions or types of various metal plates while the raw pipe is in the vicinity of the stand or in the vicinity of the forming tool;

a measurement sensor that allows measurement of a deformed shape value of the raw pipe being formed during implementation of each of the steps;

calculation means that makes comparison with the data in the storage means and expects a forming process for the raw pipe on the basis of a measured deformed shape value of the raw pipe being formed; and line automatic control means that assumes a forming process unique to the raw pipe during implementation of the pipe manufacturing step, selects positional information about a forming tool necessary for the assumed forming process, and controls the position adjusting means for position adjustment of a forming tool in the stand required to be adjusted in position.

Advantageous Effects of Invention

According to the present invention, acquiring a roll forming process by forming simulation analysis corresponds to acquiring result of analysis of a deformed shape of an entire metal raw plate subjected to roll forming while being passed through each roll stand on the assumption of individuality of a pipe mill, namely, a roll stand configuration employed in designing the mill. The individuality of the pipe mill can be regarded as being incorporated already into the forming process for the raw plate. Then, individuality of a metal plate to be used is examined to allow implementations of initial threading and continuous operation responsive to the metal plate to be used, thereby achieving automatization of the operation.

In short, if the pipe mill includes roll stands in 20 stages from an entry guide stand EG to a Turk's head stand TH, for example, it is determined whether roll positions in all the 20 stages and a deformed shape value of a raw plate extending over a length corresponding to the 20 stages such as an edge position, a width, a height, or a peripheral length, for example, of the raw plate conform to a roll forming process determined by forming simulation analysis using an ideal model generated using this pipe mill. If a difference of an actual operation model from the ideal model is detected, on the basis of the operation of making comparison and expectation to determine a roll position and a stand including this roll position along a line where the difference is detected and to determine a degree of the difference, it is possible to assume individuality as the raw plate according to an actual operation model and to grasp a forming process according to a correction model for making approximation to the deformed shape value of the raw plate according to the ideal model.

Approximation to an ideal forming process can be made by making decision to employ the correction model on the basis of the above-described measured data and by making position adjustment of a forming tool upstream or downstream from a corresponding measurement point and also position adjustment of a plurality of particular forming tools along the line. By doing so, position adjustment of a particular forming tool is made on the basis of result of measurement obtained at a large number of measurement points. By repeating such machine learning technique, it becomes possible to encourage automatization of operation through an entire pipe mill and position control of a forming tool.

In addition to the achievement obtained by the machine learning, deep learning technique is used to cause a neural network having a multilayer structure to learn the above-described data and actual operation is repeated. By doing so, it becomes possible to provide an artificial intelligence AI leaning function that grasps an individualized model beyond the scope of the assumption on the basis of resultant data, etc., and produces a correction model therefor, for example.

EMBODIMENTS FOR CARRYING OUT INVENTION

Figure 1:
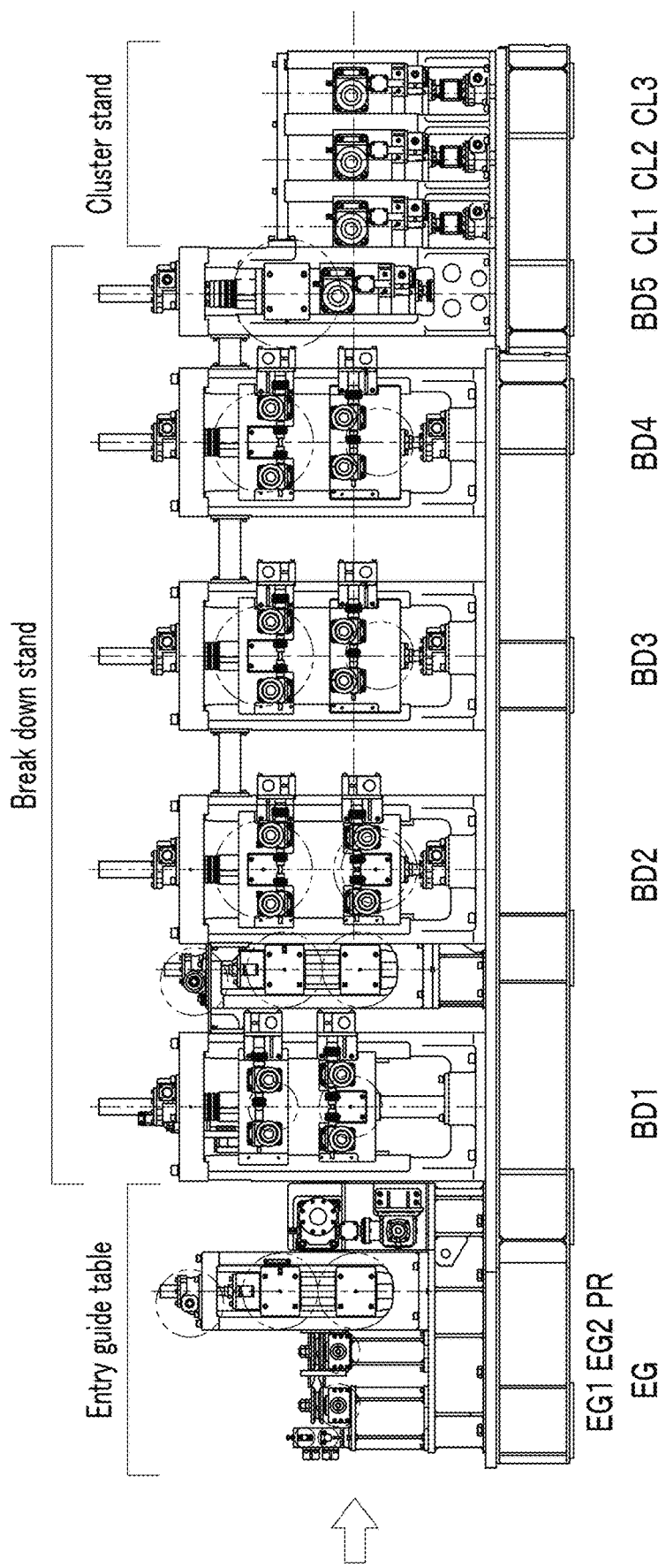
FIG. 1 is a side explanatory view of a half on an upstream side of a pipe mill according to Example 1 taken from an operation side of a pass line direction (in which a steel plate as a raw plate travels from left to right of the drawing) and shows an entry guide stand EG corresponding to an entry side table, a breakdown roll stand BD in an initial forming section, and a cluster roll stand CL in an intermediate forming section.

Constituting elements of the present invention will be described.

A metal plate as a forming target is a continuous strip material made of ferrous or non-ferrous metal, or is a plate material of a required length made of these materials. As a material is generally provided as coiled strip materials, what has been done is to connect these materials to each other to form a continuous object. In the present invention, pipes in units of coils can be manufactured without the need of connecting coiled materials to each other in succession and supplying a resultant material.

A forming tool is a forming roll described in Patent Literature 1 (U.S. 62/121,925B1) or Patent Literature 2. A forming tool described in Patent Literature 8 (EP 22610414B1), Patent Literature 9, or Patent Literature 10 (EP 2636463A1) is also usable in which a forming caliber forms a continuous endless track.

A stand to be employed can take any type of mechanical shape achieving a configuration in which a forming tool is held in the stand across position adjusting means of adjusting the position of the forming tool relative to a forming target metal plate or a raw pipe being formed.

The position adjusting means is configured appropriately by using various types of mechanical elements such as a jack or an actuator for providing horizontal motion (extension and contraction), vertical motion (upward and downward motion), and a swinging function relative to a vertical section perpendicular to a pipe manufacturing line of a forming roll, for example, and by combining such mechanical elements with a power source such as an electric motor or a hydraulic machine.

A pipe manufacturing step means an initial forming step using a breakdown roll stand BD in which bending of a metal plate is started at its opposite end portions (edge portions), for example, an intermediate forming step using a cluster roll stand CL in which bending is performed to form a sectional shape of the metal plate from an arc-like shape gradually into a round raw pipe, and a final forming step using a fin-pass roll stand FP for fixing the shapes of the edge portions of the raw pipe intended for butting and forming into a required round pipe shape.

Both bending and squeezing are performed in a fin-pass section. In order to fix the sectional shape of the raw pipe or the shape of an edge end surface to provide shape finishing into a state suitable for welding, and in order to perform finishing of a peripheral length for implementing stable upset using a squeeze roll, what has conventionally been done is to measure an outer peripheral length of the material using steel tape at the time of initial threading or temporary holt of operation and adjust a squeeze amount by adjusting the position of a roll so as to obtain a required peripheral length.

However, it is impossible to measure the peripheral length during normal operation, etc. Hence, the roll position has roughly been managed using a current roll gap amount expectable from a movement position of a jack, for example, for adjusting the position of the roll. For this reason, importance has conventionally been placed on an empirical rule obtained from line operators.

In the case of high-frequency welding, for example, a welding step is to cause a squeeze roll stand to press-fit a seam portion (opposite edge portions of the raw plate) heated by a high-frequency resistance welding machine. In addition to forming a butting contact between edges, a butting state (I groove or V groove, for example) is adjusted by making fine adjustment of the heights of right and left edges (wrap) in a middle-diameter or large-diameter mill for manufacturing a thick product.

As a welding method, in addition to high-frequency welding of induction type or direct feeding type, publicly-known welding methods such as TIG welding, plasma welding, and laser welding are selected appropriately or used in combination with each other in response to a dimension, a metal material, a purpose of use of a pipe, quality such as specifications, etc.

An inner/outer bead scarfer is arranged in a downstream region of the squeeze roll stand for removing molten steel (bead) continuously having been discharged to inner and outer surfaces of a welded pipe. To check a state at a welded seam, a temperature or a temperature distribution is measured or ultrasonic flaw detection is conducted.

A mid-frequency induction current seam annealer for local quenching or annealing of the welded portion and a thermal processing section such as an air-cooling zone/water-cooling zone are arranged appropriately in response to required specifications of a pipe to be manufactured. In particular, in the case of an oil well pipe, the above-described check and adjustment of the seam portion is made carefully.

If an inner bead cutting or thermal processing is not to be performed for pipe manufacturing of manufacturing a pipe for construction, a function is stopped in the above-described mill section and the pipe is simply driven to pass through this section.

In a sizing step, in addition to a sizing roll stand SZ for providing a constant diameter of a round pipe and a Turk's head roll stand TH for correcting straightness, a di-twist roll stand using a grooved roll for correcting twist can be arranged, if appropriate.

A reshaping step for forming a round pipe into a square pipe requires sections for sizing, reshaping, and a Turk's head. A selection for a pipe shape can be made between a round pipe and a square pipe along the same line by the presence or absence of operation of the reshaping section.

At the above-described fin-pass roll, squeeze roll, and sizing/reshaping section, a roll stand employed therein has a two-direction or four-direction roll configuration as a forming tool responsive to the dimension of a product pipe to be manufactured. This makes it impossible to achieve multi-use of a roll, so that roll changing is necessitated in response to a different dimension of a forming target raw pipe caused by so-called dimension changing.

For the roll changing in the case of a small-diameter pipe, a relatively light-weight roll stand in its entirety may be changed to a corresponding roll stand adjusted in an offline place. In the case of a middle-diameter or large-diameter pipe, however, the changing requires time and effort. In response to this, by employing a roll stand having a roll quick change mechanism of changing only a roll in the stand while leaving an actuator or a jack for positional adjustment of the roll unchanged such as that described in Patent Literature 4 (EP 2700457B1), Patent Literature 5 (EP 2520380B1), Patent Literature 6 (PCT), or Patent Literature 13, it becomes possible to encourage improvement of productivity.

A publicly-known method for arranging four-direction roll stands in multiple stages may be employed as means of reshaping from a round pipe into a square pipe. However, this necessitates changing of all four-direction rolls each time the dimension of a product (metal plate) is changed. This inevitably causes reduction in productivity. In response to this, in order to advance multi-use of a roll like in Patent Literature 7 (EP 1815921B1) or Patent Literature 12, two-direction rolls are arranged alternately in multiple stages in a top-bottom direction and a right-left direction, a particular shape is employed for a roll surface, or a particular distribution is defined as a rolling amount distribution using a flat roll, for example. In this way, using a roll stand employing a roll box mechanism with two-direction rolls arranged in multiple stages eliminates the need of roll changing.

A manufacturing method of the present invention is characterized in that analysis by a simulation analysis method is conducted in advance on a forming process of forming a metal plate into a round pipe or a square pipe while using all forming tools to be used in a targeted pipe mill.

This analysis is to analyze a forming process of forming a metal plate into a metal pipe using a large number of predetermined forming tools in the pipe mill by conducting simulation analysis on elastoplastic deformation based on a roll flower defined in advance. As shown in a conceptual perspective explanatory view of simulation analysis result shown in FIG. 7 or 8, for example, using a metal plate of a certain dimension and a certain material as a target, a forming process is analyzed as correlation between a deformed shape state of a raw pipe deformed from a metal plate to a metal pipe using all forming tools in the pipe mill and positioning of a forming roll contacting the raw pipe. Time of the analysis may be shortened by conducting simulation analysis on each section of the pipe mill.

A forming process assumed in a certain pipe mill is analyzed for each of metal plates of various dimensions (plate widths, thicknesses) in a range of multi-use of a forming tool or each of various types of metal plates of respective dimensions or qualities based on differences in the dimensions, materials or purposes of use of the metal plates, or types thereof such as specifications.

A forming process defined by using a roll flower is based on the assumption that a raw pipe is in a state directly under a forming roll. However, a deformed shape value of the raw pipe directly under the forming roll is not measurable.

On the basis of result of the analysis on the various types of forming processes described above, it is possible to acquire a deformed shape value of a raw pipe in the vicinity of each of all forming tool stands that may be upstream or downstream from a position immediately near the stand, for example, or a deformed shape value of the raw pipe in the vicinity of a forming tool such as a forming caliber in each stand, and positional information about the forming tool in each stand.

The analysis result about these various forming processes can be assumed as data about each metal plate having the assumed certain dimension and quality described above, namely, data about a correlation value according to a certain ideal model relating to a certain type of metal plate between a deformed shape value of a raw pipe and the position of a forming tool.

In another case, in a forming tool stand in a certain range or at a particular position along a pass line of a pipe mill, such analysis result can also be regarded as data about a correlation value between a deformed shape value of a raw pipe in the vicinity of the stand or in the vicinity of the forming tool and positional information about the forming tool in the particular stand.

An analysis method to be employed for analyzing a forming process during the course of forming a certain metal plate into a metal pipe using a certain forming tool that may be a forming roll, for example, may be simulation analysis that is conducted using various types of publicly-known analysis methods on the basis of a roll flower and roll surface shape design assumed to be employed at the time of design. For example, CAE analysis is used for mechanical design and a finite element method is indispensable. Preparation of a model and shape simplification for the method are required. An analysis method using 3D CAD and a combination of shape data and various types of analysis methods can also be employed. Moreover, three-dimensional elastoplastic FEM analysis may be employed additionally for the analysis.

Furthermore, if a computer uses three-dimensional CAD data and a three-dimensional elastoplastic FEM analysis method, a program for parallel processing using a large number of CPUs and GPUs can be employed for increasing the accuracy of the analysis and shortening time of the analysis.

As a result of the foregoing simulation analysis, it becomes possible to acquire analysis result about a variety of forming processes as data about correlation values between deformed shape values of a wide range of raw pipes and a forming tool position.

The foregoing analysis result may simply be used as numerical value data for further analysis. However, in order to allow recognition by a human or artificial intelligence in making comparison between such correlation value data according to a certain ideal model in a certain pipe mill and correlation value data resulting from measurement using an actual operation model at the same mill, it is desirable to define and employ a program for providing the correlation value data as visualized data for allowing conversion into positional information on particular coordinates, for example, and also for allowing conversion into a two-dimensional or three-dimensional image.

By giving consideration to a raw pipe shape measurable using a measurement sensor at a pipe mill during actual operation, a deformed shape value of a raw pipe may be any one of an outer peripheral surface shape, an inner peripheral surface shape, a vertical sectional shape, an outer peripheral length, forming load at each stand in a forming tool stand array. In another case, these elements may be combined in various ways to provide the deformed shape value as visualized data.

For example, a deformed shape value of a raw pipe to be used may be a value obtained through conversion into a numerical value, visualization or conversion into an image on coordinates or in virtual space of any one of an outer peripheral surface shape, an inner peripheral surface shape, and a vertical sectional shape, or all of these shapes defined by opposite edge positions and a width dimension of the raw pipe defined in a direction horizontally perpendicular to a line center plane as a vertical plane including a pass line corresponding to a traveling direction of the raw pipe set in advance, and a height of the raw pipe observed on the line center plane.

A measurement sensor to be employed appropriately for allowing measurement of a deformed shape value of a raw pipe being formed during each of steps including pipe manufacturing, welding, and shaping may be a publicly-known measurement method such as mechanical measurement or magnetic measurement using various types of contacts or proximity elements, non-contact optical scanning using a laser beam, a camera, etc. in combination, or non-contact magnetic scanning.

Any of the above-described publicly-known methods can be employed as a method for measuring the opposite edge positions and the width dimension of the raw pipe defined in the direction horizontally perpendicular to the line center plane as a vertical plane including the pass line corresponding to the traveling direction of the raw pipe set in advance, and a height of the raw pipe observed on the line center plane described above. For measurement of forming load at each stand, any type of publicly-known load sensor is available such as a load cell for measuring load on a roll axis, for example.

For pipe manufacturing, in order to prevent a scar or dirt to be caused by scale removed by bending, a water-soluble lubricant is used like in the case of common steel. This water-soluble lubricant is injected or sprayed onto a raw pipe or a roll at a required roll stand. Hence, in an atmosphere of injecting or spraying such a solvent in large quantity, the raw pipe may be covered or wet with the water-soluble lubricant, etc., making it impossible or difficult to measure a deformed shape value of the raw pipe.

This may be handled, for example, by using a metal plate de-scaled in advance through a chemical de-scaling process such as pickling or a mechanical de-scaling process performed in an off-line place. Furthermore, pipe manufacturing may be started after performing a mechanical de-scaling process on any of an entire surface, an outer peripheral intended surface, and an inner peripheral intended surface, or part of these surfaces of a metal plate as a raw material before forming.

During such a pipe manufacturing step, it is desirable to perform partial lubrication of spraying a small quantity of a water-insoluble lubricant onto a required portion of a metal plate or a forming tool in response to need without using a water-soluble lubricant.

For example, any publicly-known method is applicable to the mechanical de-scaling process performed before start of the pipe manufacturing step. Examples of a method to be employed appropriately include shot-blasting on a required metal plate surface with fine abrasive grains, projection of slurry in a high-speed fluid, repeated bending using a rough surface roll, and a brushing process performed in combination.

The concept of a forming method according to the present invention will be described.

For example, for forming a metal plate having a certain metal material, a certain dimension, and a certain thermal history in a pipe mill with a forming tool in predetermined arrangement, a formed state of a raw pipe in a fin-pass roll stand or in a squeeze roll stand in this mill is grasped as data about a correlation value between a deformed shape value of the raw pipe in the vicinity of the fin-pass roll stand or a squeeze roll stand, specifically, at a position immediately before an entry side or immediately after an exit side of a forming roll such as a position immediately before or immediately after the stand, which may be an outer surface shape of the raw pipe based on this deformed shape value, and positioning of a forming roll contacting the raw pipe.

Specifically, a measured value of the deformed shape value in the stand in which the measurement has been made and positional information about the forming roll at this stand set in advance according to an ideal model are used to grasp a current formed state of the raw pipe at the time of the measurement at the position of the measurement.

Comparison is made with an actual operation model at the measurement point at this stand set in advance according to the ideal model. On the basis of the comparison using the correlation value data, a degree of correction required in the future such as a forming process situation likely to happen in the future, for example, is expected using machine learning data. Then, a correction plan is selected for roll position adjustment at a stand upstream from the measurement point or for roll position adjustment at a stand downstream from the measurement point, or for both of these adjustments, and also for roll position adjustment at a stand of the measurement point. Then, a direction is given for an amount of position adjustment for a particular roll at a stand where roll position adjustment is necessitated by the measurement.

In giving this direction, a passage speed of the raw pipe largely differs between initial passage and operation and also between different purposes of use such as a pipe for construction and an oil well pipe. Thus, for determinations as to a stand to be used for operation, as to selection between feedback and feed forward, and as to an operation amount, it is necessary to perform machine learning to a certain degree in advance on a program describing measurement, comparison, and expectation methods about whether a measured value at a different measurement stand is to be used for comparison and cooperation in addition to measurement at the stand to be used, about a measurement method to be employed, and about measured data to be used as a basis for comparison and expectation.

A deformed shape value of a raw pipe is any of an outer peripheral surface shape, an inner peripheral surface shape, a vertical sectional shape, an outer peripheral length, and forming load at each stand in a forming tool stand array, or various combinations of these elements. In order to judge achievement of a forming process through the stand array line entirely, driving force of each electric motor to determine a line speed, a situation or fluctuation of a torque, etc.

may be measured and used as criteria for the judgment in addition to data about the elements described above.

In addition to the achievement obtained by the above-described machine learning technique, deep learning technique is used to cause a neural network having a multilayer structure to learn the above-described data and actual operation is repeated. By doing so, it becomes possible to provide an artificial intelligence AI leaning function that grasps an individualized model beyond the scope of the assumption on the basis of resultant data, etc., and generates a correction model therefor, for example.

Calculation means, which makes comparison with data in the storage means and expects a forming process for a raw pipe on the basis of a measured deformed shape value about the raw pipe being formed, calculates a correction model prepared for a raw pipe subjected to an assumed unique forming process and containing data about a correlation value between a deformed shape value necessary for making approximation to data about a correlation value according to an approximate ideal model and positional information about a forming tool. Then, the calculation means exerts control using line automatic control means so as to adjust the position of a forming tool at a stand required to be adjusted in position for implementing the correction model.

The data about the correlation value between the deformed shape value and the positional information about the forming tool contained in the correction model calculated by the calculation means may be stored in a storage device as data about a correlation value of a learned model relating to a metal plate of an additional unique dimension or also of an additional unique type and may be used as stored data.

A publicly-known computer is applicable to the calculation means. For example, a computer to be used may be a computer as artificial intelligence including a main engine ME as a center responsible for every type of calculation and synthetic judgment, and a core engine CE responsible for various types of functions.

An exemplary configuration will be described on the basis of FIG. 14. The calculation means (computer) to be used can be a computer as artificial intelligence including the main engine ME as a center responsible for every type of calculation and synthetic judgment, and various types of functions that are core engines CE as follows, for example.

1) An operation core engine OEC responsible for acceptance of an operation plan or condition input by an operator to line control means for control over all forming tools in an entire stand array line and for processing and judgment such as conversion into data.

2) A recognition core engine RCE responsible for recognition and processing of measured data from a measurement sensor.

3) A comparison core engine CCE for comparison of a measured deformed shape value with a deformed shape value in stored data.

4) An expectation core engine ECE responsible for expectation of a forming process in current operation based on a difference between compared data values and for expectation of an operation condition in the future, etc. such as expectation of a correction program.

5) A selection core engine SCE responsible for judgment such as selection of a forming tool to be corrected on the basis of change in the operation condition in the future or the correction model using the expected forming process or a difference between positional information about a forming tool at each stand and positional information about a forming tool during operation.

6) A direction core engine DCE responsible for measurement direction or position control direction of giving a direction for measurement to a required measurement sensor or giving a direction for position adjustment to a selected forming tool, for example.

7) A machine learning core engine MLCE responsible for machine learning such as learning of programming for entire operation including position adjustment of each forming tool by following a forming process according to an ideal model acquired from result of simulation analysis.

8) A deep learning core engine DLCE responsible for deep learning of expecting a forming process in an actual operation model and generating a correction model as a new real machine expectation model on the basis of data such as sensor measurement result corresponding to actual operation result or control result composed of positional information about a forming tool.

9) An integrated learning core engine ILCE handling the machine learning core engine MLCE and the deep learning core engine DLCE in an integrated manner.

10) A storage core engine SCE functioning as storage means and responsible for storage of data including:
    ideal model, simulation analysis result
    correction model
    real machine model, operation result (measurement result, position control result).

Sensor control means controls motion of a sensor installed at a stand or between stands in a line, and transmits and receives data, etc.

Roll position control means controls actuation of a jack or an actuator installed at each stand, for example, and transmits and receives an actuating state, sole position information, etc.

The line control means selects an operation stand, adjusts a roll position, and makes preparation for operation such as roll changing in response to input of an operation condition.

EXAMPLES

Example 1

Figure 2:
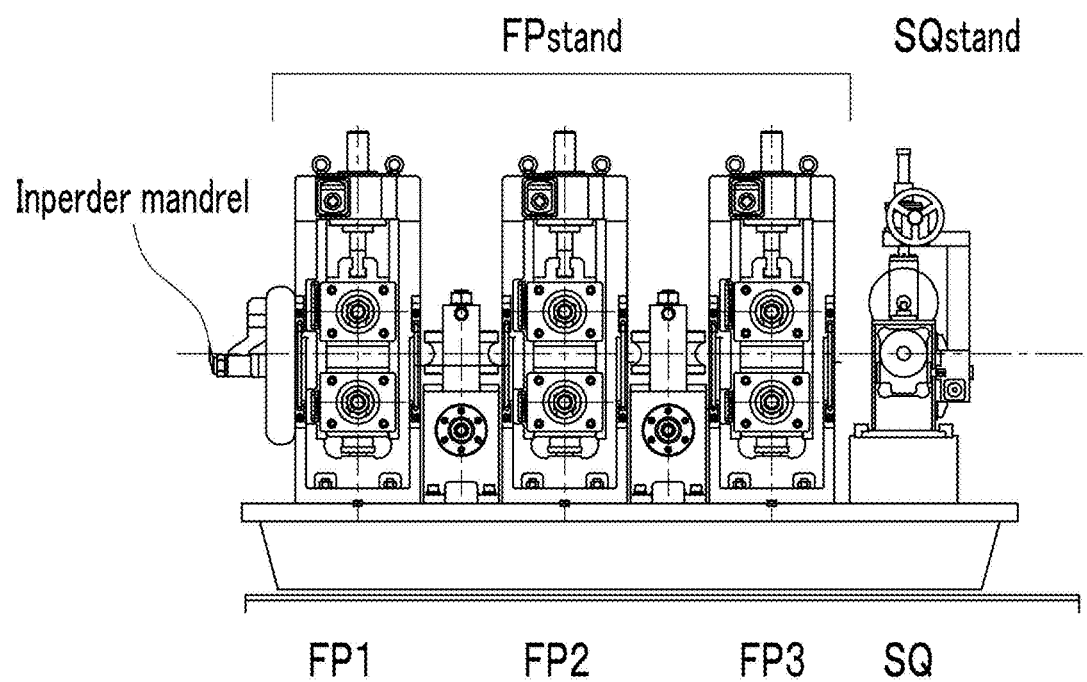
FIG. 2 is a side explanatory view of a section continuous with the pipe mill in FIG. 1 taken from the operation side of the pass line direction and shows a fin-pass roll stand FP and a squeeze roll stand SQ.
Figure 3:
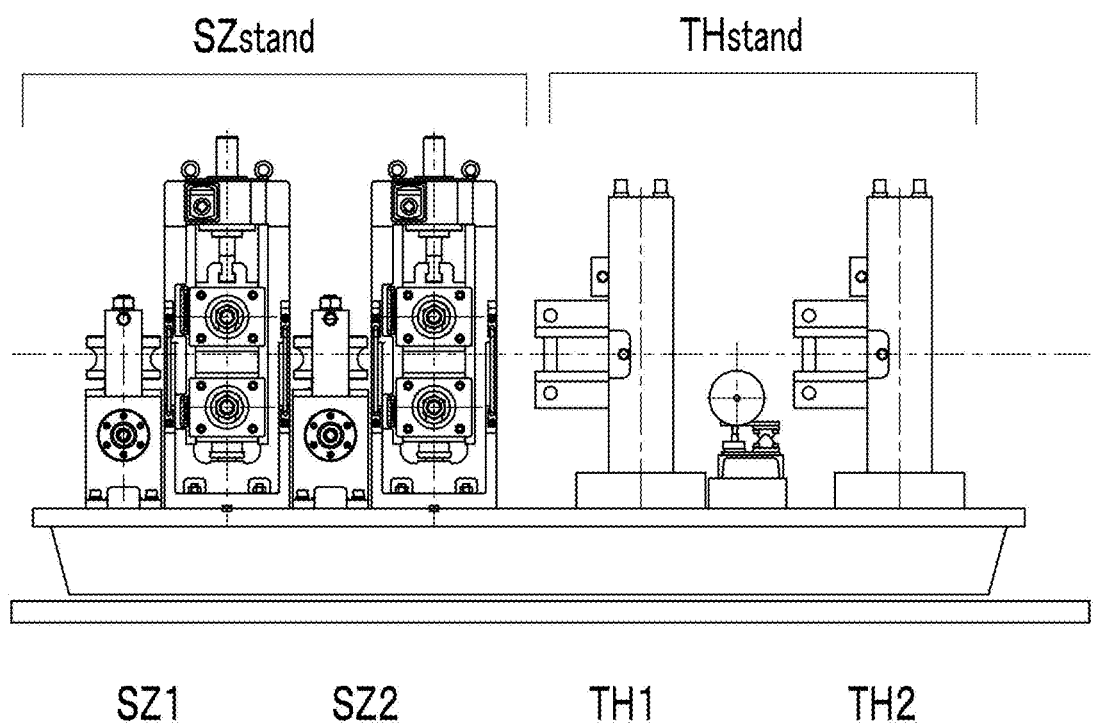
FIG. 3 is a side explanatory view of a half on a downstream side of the pipe mill according to Example 1 taken from the operation side of the pass line direction and shows a sizing roll stand SZ and a Turk's head roll stand TH used in a sizing step for correcting a dimensional shape.

A 5-inch mill line shown in FIGS. 1 to 3 is an existing line designed in 2000. An intended product caliber is from 42.7 to 127 mm. This mill is to form a round pipe for construction or for piping without performing a thermal process in an online place for increasing quality, and is to operate under a difference in dimension and material of a forming target metal plate as an operation condition.

Various types of common steel for construction or piping were used as a steel plate. A de-scaling process was completed through mechanical bending performed repeatedly and through brushing.

The mill line in which a round pipe is formed through a pipe manufacturing step, a welding step, and a sizing step using forming rolls includes a stand array having a configuration in which the forming tool used in each of these steps is held in the stand across position adjusting means of adjusting the position of the forming roll relative to a forming target metal plate (raw pipe).

An entry guide stand EG corresponding to an entry side table is composed of side roll stands EG1 and EG2 in two pairs for introduction and upper and lower pinch roll stands PR. The pinch roll stand PR is driven for applying thrust to a forming target metal plate.

Manually operated structures are shown in the drawings. To allow each of the side rolls to make horizontal motion (extension and contraction) relative to a vertical section perpendicular to a pipe manufacturing line, a roll bearing thereof moves horizontally across a motorized screw jack held horizontally movably on a stand. Improvement was also made to motorize a jack so as to allow the pinch roll to move vertically (upward and downward motion).

An initial forming section is composed of breakdown roll stands BD1 to BD5 in five stages. While a pinch roll stand for reinforcing thrust is arranged between BD1 and BD2 in the drawing, this pinch roll stand is removed in Example 1 for installation of a sensor as described later.

The initial forming section employs a method for pinching one location with upper and lower rolls and performing bending along a surface of either one of the upper and lower rolls as described in Patent Literature 1, and employs a technique (FFX) of using a forming roll for multiple purposes within the above-described product caliber range.

Figure 4:
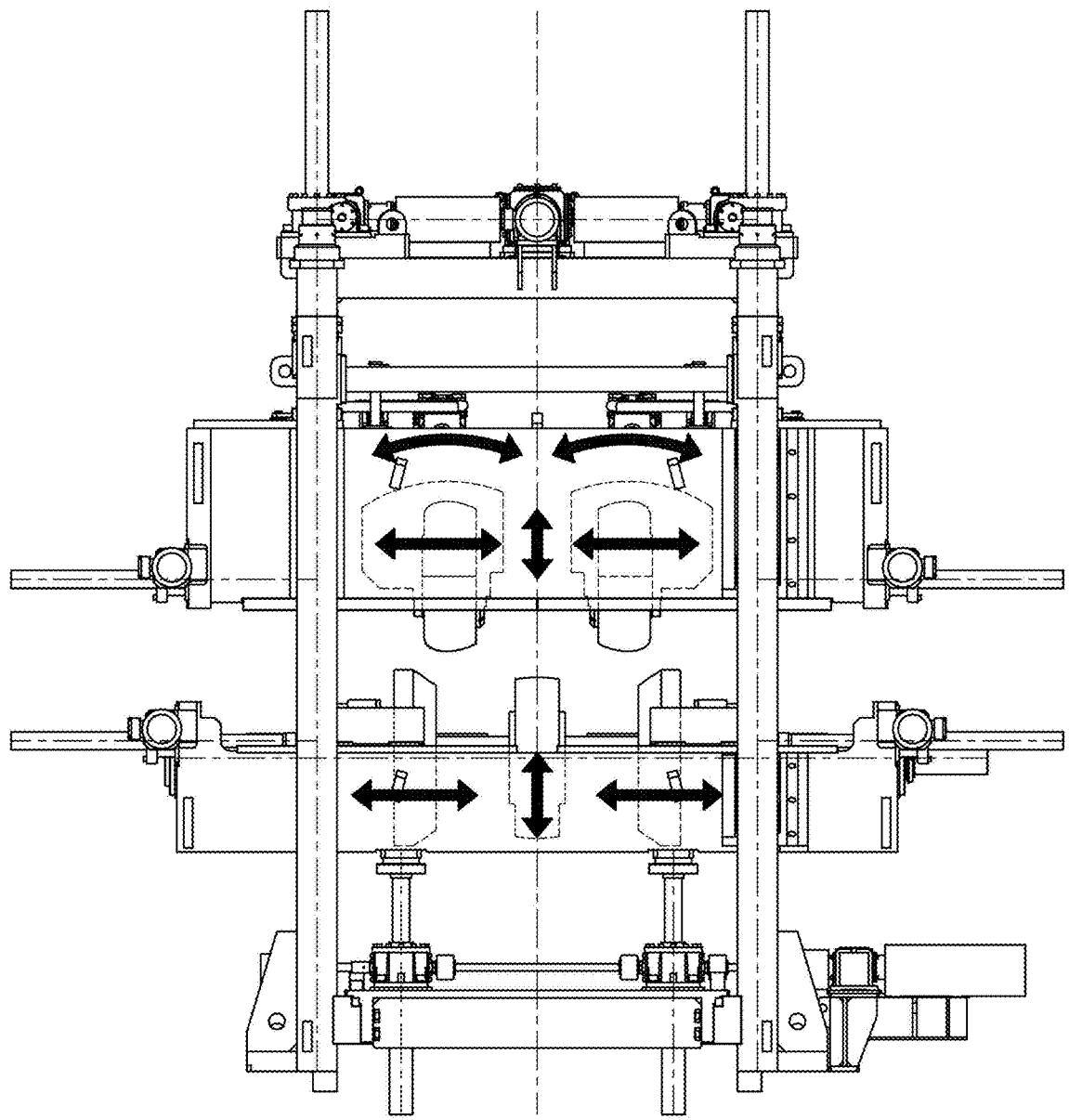
FIG. 4 is an explanatory view explaining the function of a position adjusting mechanism for forming rolls at the breakdown roll stand BD in FIG. 1 and is a front explanatory view of the stand taken from an upstream side toward a downstream side of the pass line direction.

As shown in FIG. 4, the breakdown roll stand BD1 in the first stage is composed of an upper roll (top roll) having a swinging roll function of changing a position to abut on a raw plate, a lower roll (side roll) for edge bending while pinching the vicinities of opposite edge portions of the raw plate together with the upper roll, and a middle roll (center roll) arranged between the lower rolls in a pair and driving up a central portion of the raw plate.

Figure 5:
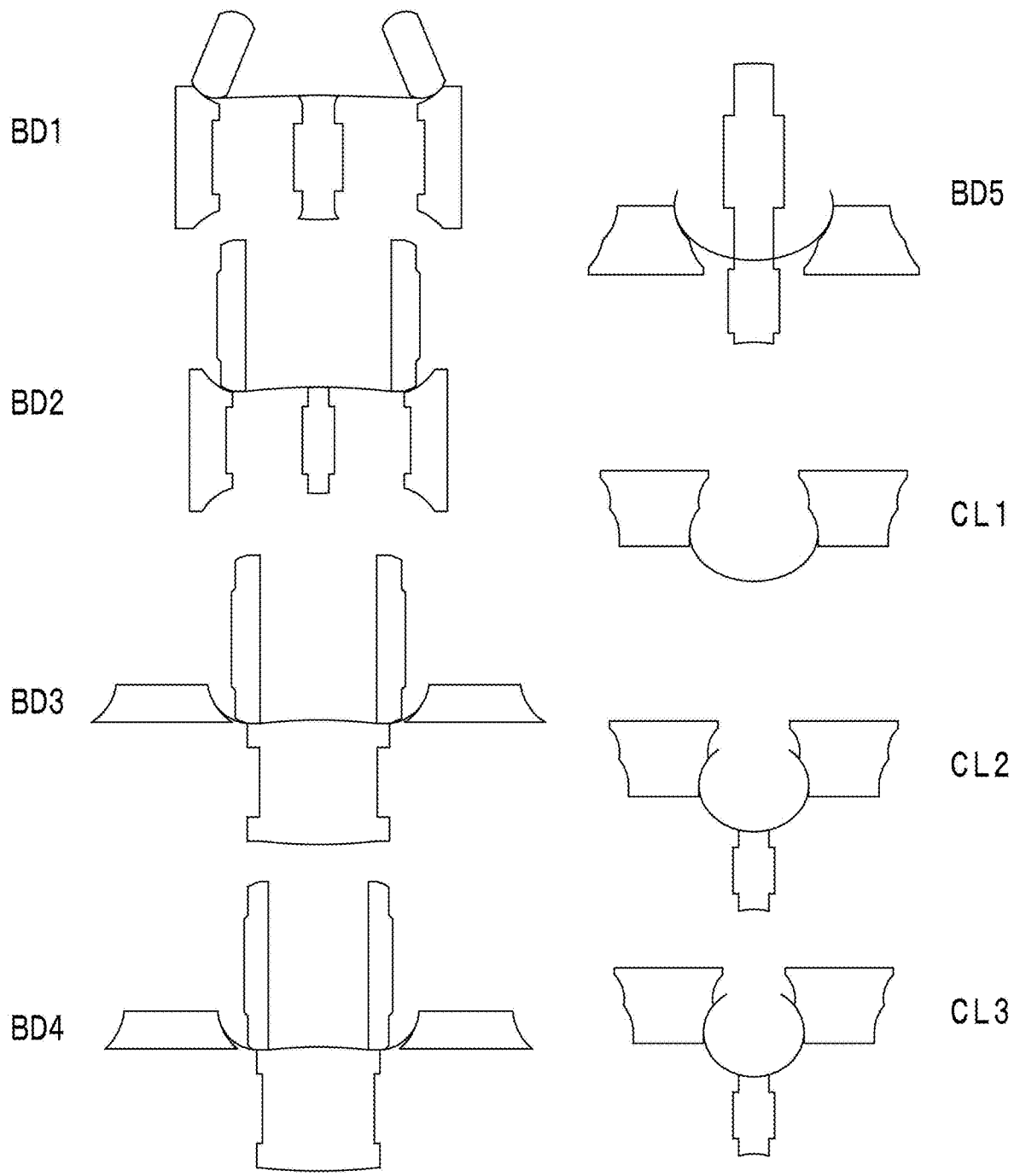
FIG. 5 is a front explanatory view taken from an upstream side toward a downstream side of a pass line showing positional correlation of a forming target metal plate at the breakdown roll stand BD and the cluster roll stand CL in FIG. 1 with forming rolls and shows a case of large-diameter pipe forming using the metal plate of a large width.
Figure 6:
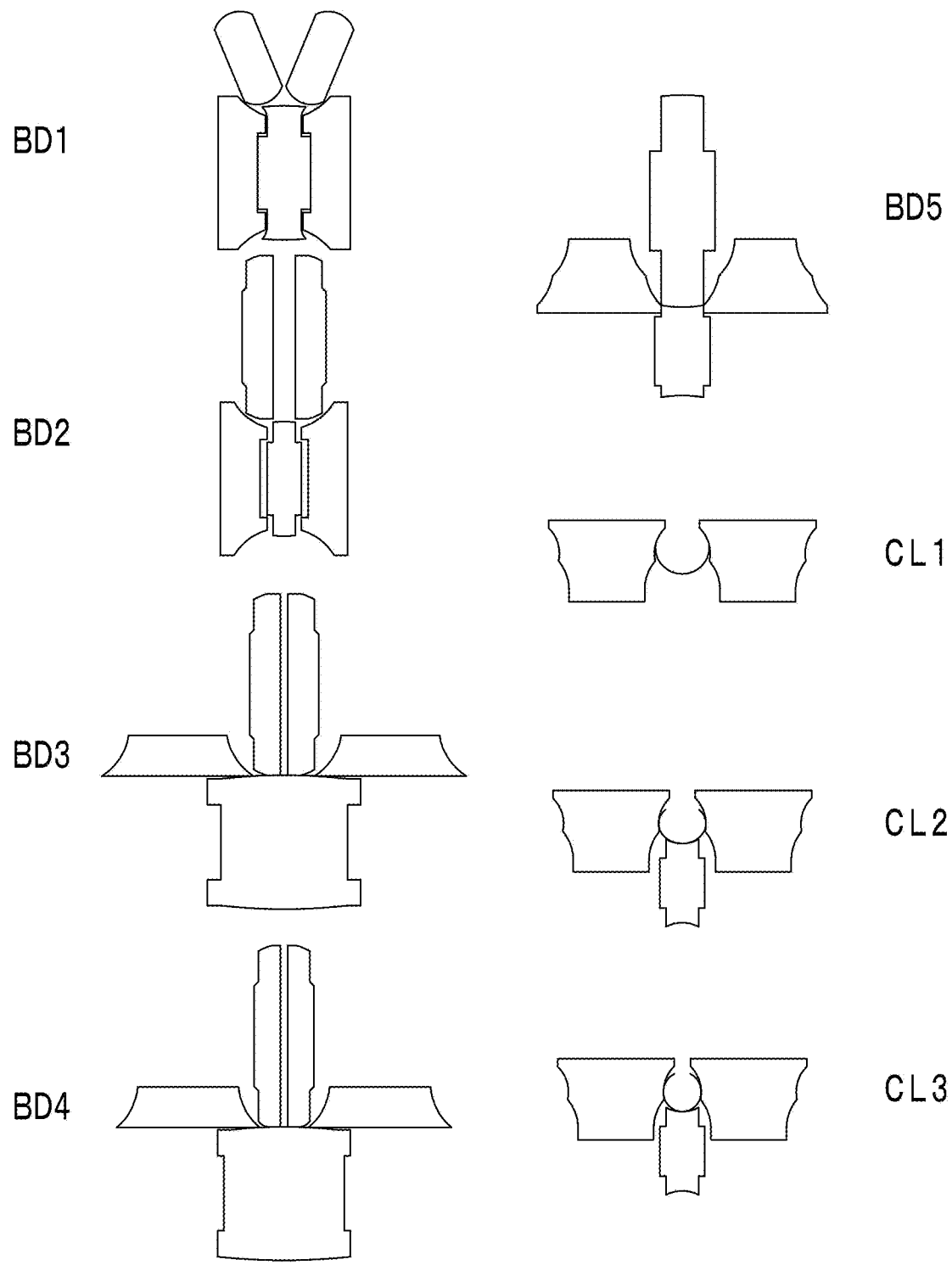
FIG. 6 is a front explanatory view taken from the upstream side toward the downstream side of the pass line showing positional relation of the forming target metal plate at the breakdown roll stand BD and the cluster roll stand CL in FIG. 1 with the forming rolls and shows a case of small-diameter pipe forming using the metal plate of a small width.

As shown in FIGS. 5 and 6, the breakdown roll stand BD2 in the second stage is composed of upper rolls in a pair for forming of a portion internal to the opposite edge portions, lower rolls in a pair for pinching the raw plate together with the upper rolls, and a middle roll arranged between the lower rolls in a pair and driving up the central portion of the raw plate.

The breakdown roll stands BD3 and BD4 in the third stage and the fourth stage respectively each include a side roll to abut on the opposite edge portions after subjected to the edge bending, upper rolls in a pair for forming of a portion internal to the opposite edge portions, and a wide lower roll for pinching the raw plate together with the upper rolls.

The breakdown roll stand BD5 in the fifth stage is composed of side rolls in a pair to abut on edge bent portions and curved portions internal to the edge bent portions of the raw plate, and upper and lower rolls for curving the central portion of the raw plate.

An intermediate forming section is composed of cluster roll stands CL1 to CL3 in three stages.

The cluster roll stand CL1 in the first stage is composed of side rolls in a pair to abut on the edge bent portions and the curved portions internal to the edge bent portions of the raw plate for further preforming rounding.

The cluster roll stands CL2 and CL3 in the second stage and the third stage respectively are each composed of side rolls in a pair and a lower roll for rounding the central portion of the raw plate. The raw plate is formed into a substantially round pipe in the third stage.

While not shown in detail in the drawings, each roll bearing box is supported in a stand in such a manner as to provide each forming roll with horizontal motion (extension and contraction), vertical motion (upward and downward motion), and a swinging function relative to a vertical section perpendicular to a pipe manufacturing line. Each forming roll is configured to be adjusted in position across a motorized jack or actuator.

The initial forming section and the intermediate forming section described above are always used for multiple purposes within an intended caliber range and are not to be changed. As shown in FIGS. 4 to 6, contact with the raw plate and forming of the raw plate are realized by making swinging motion, horizontal movement in a plate width direction, and vertical movement in the top-bottom direction of the upper roll, horizontal movement of the lower roll in the plate width direction, horizontal movement of the side roll in the plate width direction, and vertical movement of the middle roll in the top-bottom direction relative to the raw plate.

Thus, each forming roll is to move to various positions in a stand. FIG. 5 shows the position of each forming roll during forming with a maximum diameter (maximum plate width) in an intended caliber range. FIG. 6 shows a roll position during forming with a minimum diameter (minimum plate width) in the intended caliber range.

In FIGS. 5 and 6 showing a difference in position of a multi-use forming roll resulting from a difference in the above-described product dimension, assuming that there are 13 different plate width dimensions and 12 different plate thickness dimensions, 156 different sizes are produced. While a dimension of an extremely small diameter and an extremely large thickness and a dimension of an extremely large diameter and an extremely small thickness are not available for forming and can be excluded, at least a hundred and several tens of forming roll positions are assumed.

A latter forming section is composed of fin-pass roll stands FP1, FP2, and FP3 in three stages and a squeeze roll stand SQ.

The fin-pass roll stands FP1, FP2, and FP3 are each composed of a fin roll for fixing end surface shapes at edge portions of a raw pipe intended to form butting contact therebetween, and a side roll and a lower roll for forming into a required round pipe shape. Here, both bending and squeezing are performed. A sectional shape and an edge end surface shape of the raw pipe are fixed to provide shape finishing into a state suitable for welding. Thus, for forming into a different product dimension, change is made to a forming roll responsive to the product dimension.

While the manually operated structures are shown in the drawings, improvement was made to motorize a jack for each of the upper, lower, and side rolls.

A squeeze roll for high-frequency welding in the squeeze roll stand SQ is used not only for making contact under pressure with a seam portion heated with a high-frequency induction coil for resistance welding but also for finely adjusting the heights of right and left edges (wrap).

While not shown in the drawings, an inner/outer bead scarfer for continuously removing molten steel (bead) discharged to inner and outer surfaces of a pipe is arranged in a stream region to a sizing step downstream from the squeeze roll stand. To check a state at a welded seam, a temperature or a temperature distribution is measured, or ultrasonic flaw detection or eddy current flaw direction is conducted. A line mentioned herein is for a construction material and a mid-frequency induction current seam annealer for local quenching or annealing of the welded portion described above is not provided.

The sizing step shown in FIG. 3 is composed of sizing roll stands SZ1 and SZ2 in two stages for providing a constant diameter of a round pipe, and Turk's head roll stands TH1 and TH2 in two stages for correcting straightness. As a roll stand to be employed as each of these stands has a two-direction or four-direction roll configuration responsive to the dimension of a product pipe, it is not possible to encourage multi-use of a roll. Thus, in response to a difference dimension of a forming target raw pipe, change is made to a roll responsive to a caliber.

While rolls are not shown and only the stand configuration is shown in FIG. 3, a jack, an actuator, etc. are used for applying horizontal motion (extension and contraction) and vertical motion (upward and downward motion) relative to a vertical section perpendicular to a pipe manufacturing line, and these jack and actuator are all motorized for adjustment of a roll position.

In short, the used pipe mill line includes a stand array having a configuration in which each of all the forming rolls used in each of the above-described forming steps is mechanically held in a corresponding stand across position adjusting means allowing position adjustment of the forming roll relative to a forming target metal plate (raw plate or raw pipe), which is a motorized jack or actuator in this case.

Figure 17:
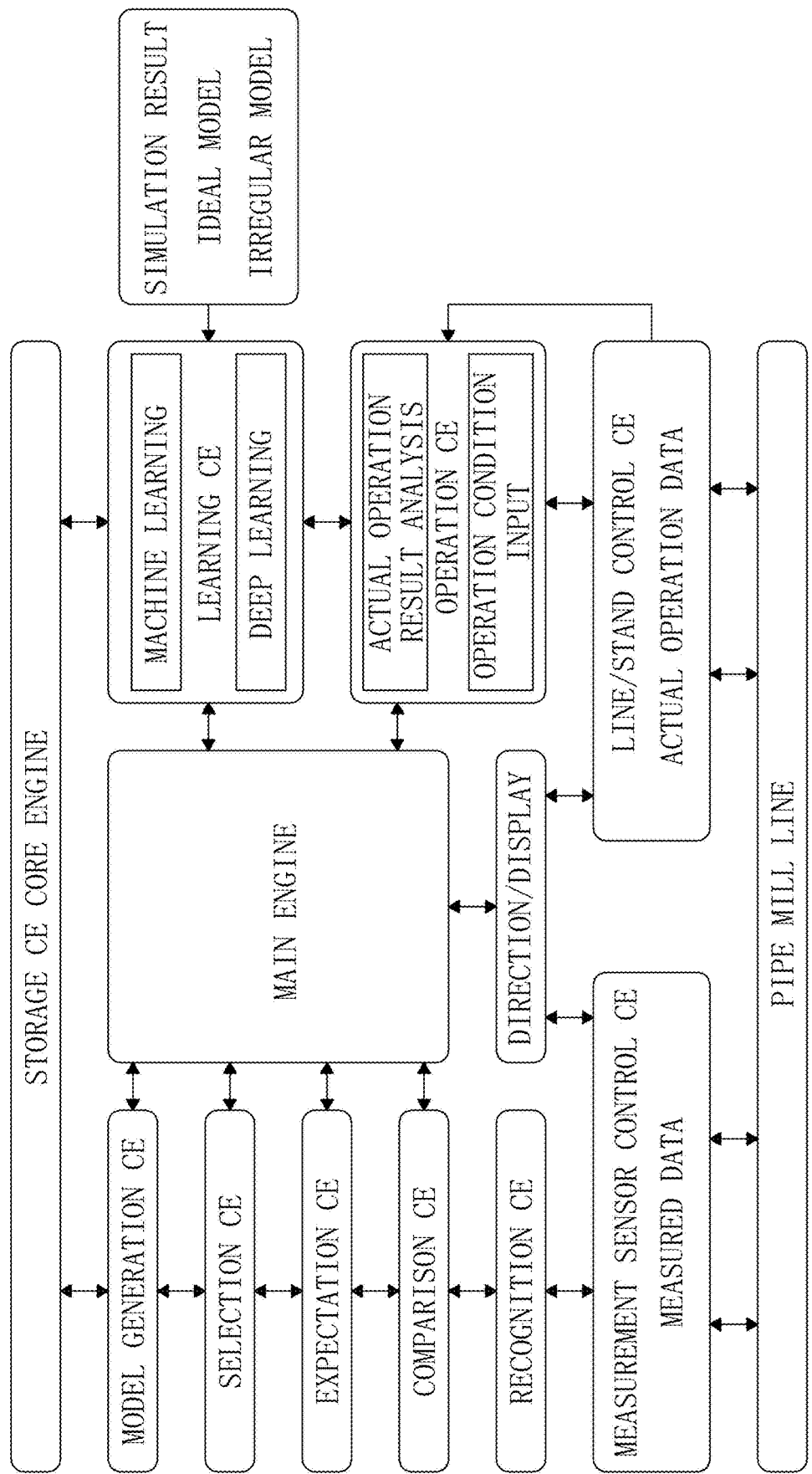
FIG. 17 is a conceptual explanatory view showing correlation between a core engine of artificial intelligence AI used in the pipe mills according to Examples 1, 2, and 3 and a position adjuster for a sensor or a stand of the pipe mill in conjunction with each other.

In this pipe mill line, in order to achieve position adjustment of a forming roll in each stand using the above-described position adjusting means, all the elements including the motorized jack and actuator are controlled by a dedicated computer (line/stand control core engine (CE)). As shown in FIG. 17, as operation data about actual operation is left in the line/stand control CE, this data is sent to a dedicated computer (operation core engine (CE)) responsible for analysis of result of the actual operation. Furthermore, data about the dimension of a forming target metal plate, a material and purpose of use of the metal plate, and a type of the metal plate such as specifications is input to the line/stand control core engine (CE) before the actual operation and is shared with the operation CE.

The line/stand control core engine (CE) is capable of controlling the position of a required forming roll automatically in response to a control direction from a different computer (operation CE or direction CE). Additionally, the line/stand control core engine (CE) has a manual mode. For example, the detail of a control direction is displayed on a direction screen for each forming step or for each forming roll stand, and an operator is encouraged to adjust the position of a particular forming roll in a required stand. By doing so, it becomes possible to check completion of the position adjustment in response to each direction.

Using the above-described pipe mill line as a target, a forming process of forming from a metal plate into a metal pipe using the forming tool is analyzed. Specifically, using arrangement of forming rolls based on a roll flower set in advance and using a simulation analysis method for analyzing three-dimensional elastoplastic deformation of a metal plate resulting from use of an intended caliber shape, which is, in this case, a simulation analysis method using various types of unique analysis technique software developed by the inventors incorporated into three-dimensional elastoplastic deformation analysis software developed by the inventors on the basis of a publicly-known three-dimensional elastoplastic deformation analysis method, a stepwise and continuous forming process of forming from a metal plate into a metal pipe using the forming rolls in the corresponding stands in the 19 stages in this mill line was analyzed for each of the above-described forming steps and was analyzed as a forming process of forming from the plate into the pipe generating elastoplastic deformation of an integrated object.

Figure 7:
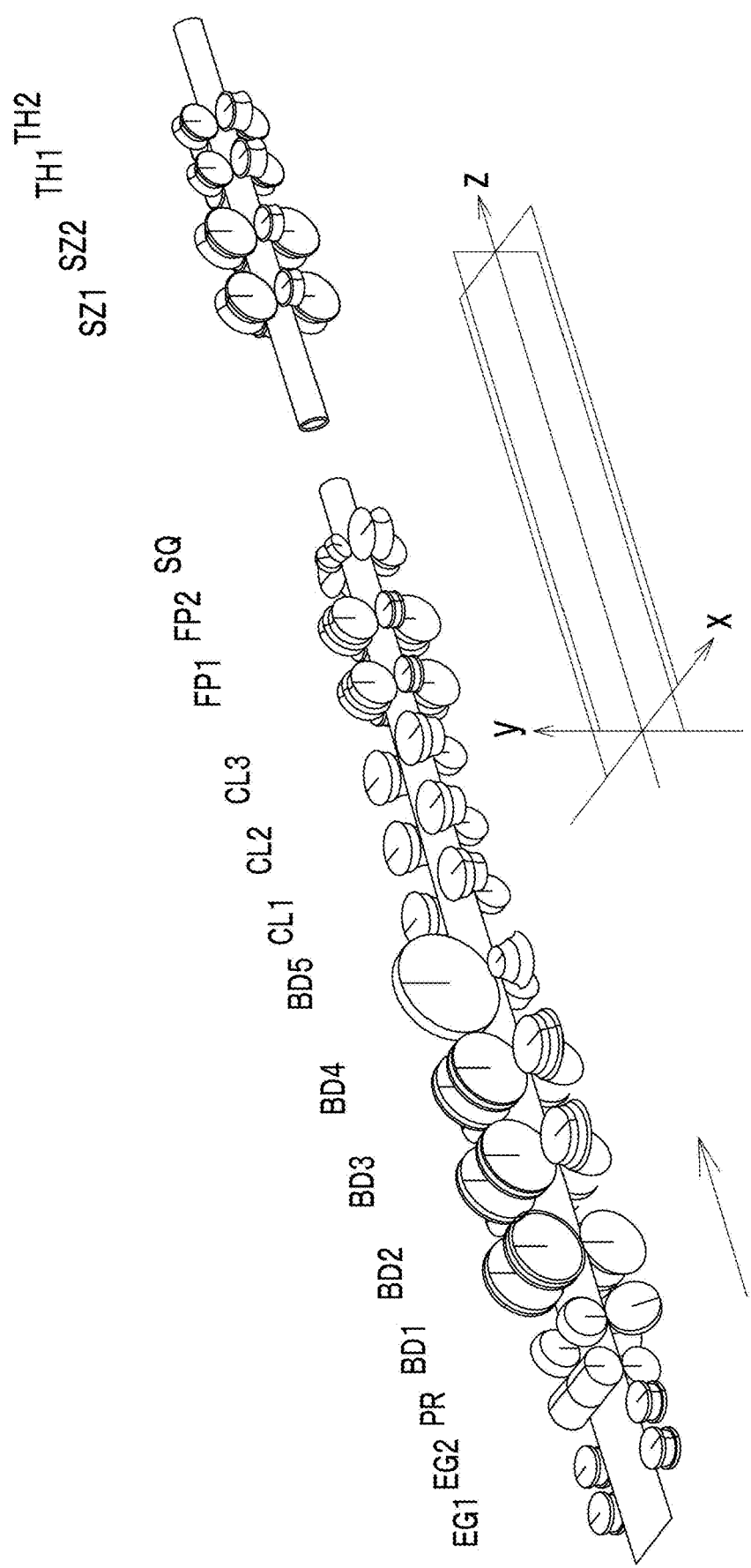
FIG. 7 is a conceptual perspective explanatory view taken panoramically in the pass line direction showing positional correlation between a forming target metal plate and forming rolls obtained from result of simulation analysis conducted on a mill with stands arranged in the same manner as in the pipe mill according to Example 1 shown in FIGS. 1 to 3.
Figure 8:
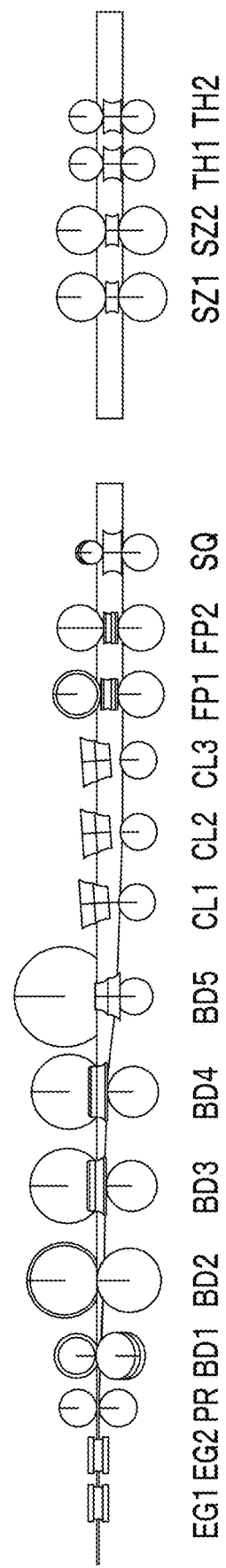
FIG. 8 is a conceptual side explanatory view taken from an operation side of a pass line direction showing positional correlation between the forming target metal plate and the forming rolls obtained from result of the simulation analysis conducted on the mill with stands arranged in the same manner as in the pipe mill according to Example 1 shown in FIGS. 1 to 3.
Figure 9:
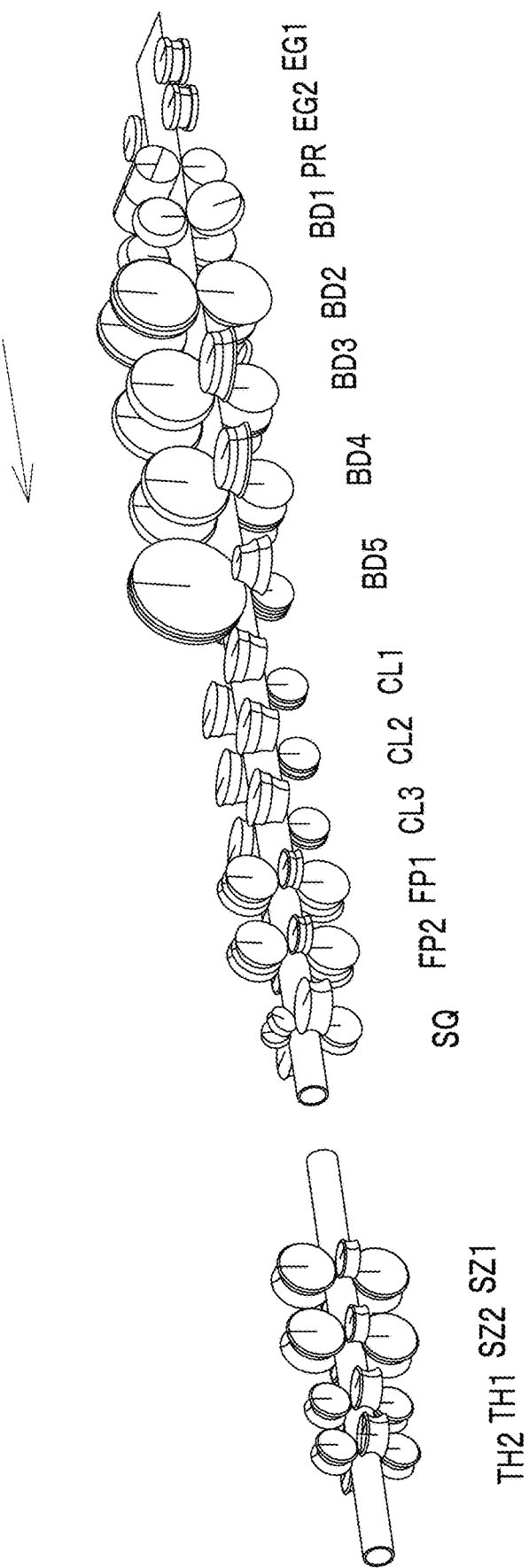
FIG. 9 is a conceptual perspective explanatory view of result of simulation analysis on a section from the squeeze roll SQ to a first breakdown BD1 in FIG. 7 taken from a squeeze roll on a downstream side toward an upstream side.

An example of the analysis on the resultant metal plate having a certain dimension and certain quality is shown in the conceptual perspective explanatory views in FIGS. 7 and 8 showing result of the simulation analysis. A forming target material is formed sequentially at a forming roll group while being fed from left to right of the drawings. These drawings show a state of abutting contact between the raw plate and the forming roll while the strip-shaped metal plate is formed into a round pipe and show correlation about the abutment therebetween. In the conceptual views of the analysis result shown in the drawings, the fin-pass roll stands are arranged in two stages.

After exit from the squeeze roll SQ, a section with the above-described inner/outer bead scarfer and seam annealer not shown in the drawings is defined between the squeeze roll SQ and the first sizing roll SZ1.

With metal plates of various dimensions (plate widths, thicknesses) in a range of multi-use intended in the pipe mill and with various types of metal plates of respective dimensions or qualities based on differences in the dimensions, materials or purposes of use of the metal plates, or types thereof such as specifications as targets, the forming process was analyzed in terms of correlation between the above-described deformed shape state of a raw pipe formed from a metal plate into a metal pipe using all the forming rolls in the pipe mill line and positioning (positional information) about a forming roll contacting the raw pipe in the stand.

The above-described deformed shape state of the raw pipe used in the analysis method can be regarded as an outer peripheral surface shape, an inner peripheral surface shape, and a sectional shape of the raw pipe. While the raw pipe as a plate is edge bent at an edge portion of a plate width end using a forming roll and a curved portion is formed sequentially toward a central portion, a position of abutting contact between a sectional shape of the raw pipe and the forming roll viewed in a two-dimensional section, for example, is identified for each of forming rolls arranged from an upstream side toward a downstream side. Moreover, forming load at each forming roll stand required for the forming is determined by the above-described simulation analysis on the forming process.

As described above repeatedly, as the foregoing FFX forming technique for multi-use of roll is used at the breakdown roll stand in the initial forming section, various types of forming rolls in corresponding stands are located positions ranging over a wide range as a result of a difference in dimension of a forming target material alone.

The three-dimensional coordinates shown in FIG. 7 are intended to indicate a deformed shape value of a raw pipe (raw plate). While a pass line (x-axis direction) as a horizontal plane covering a traveling direction (z-axis direction) of the raw pipe set in advance and a line center (y-axis direction) as a plane vertical to the pass line are defined, an outer peripheral surface shape, an inner peripheral surface shape, and a sectional shape of the raw pipe observed on the pass line plane of the measurement vertical plane (x-y axis coordinates) are grasped as a deformed shape value of the raw pipe at a required measurement intended position (z-axis coordinate) such as a position between the BD1 and BD2 stands, between the BD4 and BD5 stands, or over the cluster stand, for example.

The three-dimensional coordinates shown in FIG. 7 are similar to x-y-z axis coordinates used in three-dimensional CAD. A state of abutting contact between the raw plate and the forming roll while the strip-shaped metal plate is formed into a round pipe is identified on the coordinates. Forming load required at a corresponding forming stand is also identified.

The position of the forming roll in abutting contact with the raw pipe acquired by the foregoing analysis, specifically, the position of the forming roll in the stand in the initial forming section is absolutely indispensable for applying predetermined forming force on the forming target material. To achieve this, a roll forming process of forming a metal plate having a certain dimension and certain quality into a round pipe could be defined as an ideal model showing correlation between a deformed shape state of the raw pipe being formed and positioning of the forming roll contacting the raw pipe in a stand.

The deformed shape state of the raw pipe according to the ideal model was converted as an outer peripheral surface shape, an inner peripheral surface shape, a sectional shape of the raw pipe, and forming load at a forming roll stand into data together with information about the position of the forming roll in abutting contact with the raw pipe, namely, positional information about the forming roll in the stand.

As described above, a large number of ideal models were generated for metal plates of various dimensions (plate widths, thicknesses) and for various types of metal plates of respective dimensions or qualities based on differences in the dimensions, materials of the metal plates, purposes of use thereof, or types such as specifications.

Thus, once a dimension, or a dimension and quality of a metal plate intended to be formed are determined, the raw plate can be formed in line with a simulated ideal model by adjusting the position of a forming roll in each stand in a stand array of a pipe mill during initial threading of the metal plate in such a manner as to conform to information about an abutting contact with the raw pipe according to the ideal model defining the dimension and quality of this metal plate.

On the other hand, while a considerably large number of differences are generated in roll position of a multi-use forming roll as a result of a difference in product dimension as described above, these differences are determined in advance in making roll flower design. However, experience acquired from actual operation having been performed so far makes it known that, as a result of combination between mechanical individuality resulting from a roll stand configuration in an actual pipe mill to be used and individuality unique to a forming target metal plate such as steel making, rolling, a thermal history at a steelmaking plant and a processing history such as a cut slit condition for forming from a wide material into a required dimension width, and additionally, a regional condition such as climate or geographical features in a region in which a pipe mill is installed, condition differences are generated over a wide variety that cannot be assumed easily.

A considerable degree of causal relation is assumed to be present between such a variety of conditional details relating to the actual operation and achievement of forming. However, causal relation is known only in a small number of actual cases and is still unknown in an overwhelmingly large number of cases. This results in many occurrences of a situation where a forming target material is completely absent at a roll position assumed under the roll flower design, is late for this position, or has passed the position.

In response to this, analysis was made on a forming process using a metal plate with a condition based on unusual assumption in an exceptional case acquired from operation experience having been made so far such as a case deviating from a permissible error range of dimension, a case with a large hardness difference, or a case where rolling occurs along with traveling, for example.

A model to produce a correct answer in a perfect sense is not present regarding analysis on such a known exceptional model. A model assumed for an extreme case of causing rolling is an irregular model according to which only edge bending at the breakdown BD1 is performed perfectly, passage is managed to be made through the other stands even these stands are beyond their normal permissible ranges while such passage deviates from an ideal model, minimum forming is performed further at the cluster roll stand even if a sectional U-shape is beyond a permissible range, for example, and the forming is completed promptly at the fin-pass roll stands prepared in multiple stages. This model was also converted as an ideal model together with an outer peripheral surface shape, an inner peripheral surface shape, a sectional shape of a raw pipe, and also as forming load at a forming roll stand into data and also together with information about the position of a forming roll in abutting contact with the raw pipe, namely, positional information about the forming roll in the stand.

For edge bending operation at the breakdown BD1, as a result of a difference in hardness condition for a metal plate, various selections may be made for a swinging angle for making abutting contact of the upper roll having the swinging roll function with the raw plate. In preparation for forming at a stand in a next stage, the raw plate may intentionally be bent to a degree exceeding an intention in a former stage in expectation of springback. In this way, some irregular assumed models were generated and defined as exemplary ideal models.

Not many exceptional models are known. Thus, if forming load is insufficient at a stand previous to a certain stand, for example, an assumed model was generated on the basis of an irregular model defined under a predetermined assumed condition and the generated model was defined as an exemplary ideal model.

If the necessity to correct a forming process arises as a result of comparison with a deformed shape value and the dimension of a metal plate actually measured or with a deformed shape value according to an ideal model responsive to a dimension and quality, it becomes necessary to select a forming process corrected for making approximation to data about a correlation value according to the ideal model.

Result obtained from analysis on a forming process according to the foregoing assumed model is also necessary as a teacher model for generating a correction model containing data about a correlation value between a deformed shape value necessary for a corrected forming process and positional information about a forming tool. A variety of irregular expectation models were generated on the basis of exceptional models known or obtained by assumption, and defined as one of exemplary ideal models.

Data acquired from the various types of analysis described above is stored as data about an ideal model including an expectation model into a storage device of a publicly-known computer, and is used for comparison with actually measured data during actual operation described later. The storage device used herein is a computer (storage core engine (CE)) dedicated to read and write operation of data using an SSD.

The data about the ideal model including the irregular expectation model is first input to a dedicated computer (learning core engine (CE)) responsible for both machine learning and deep learning, and is stored in the storage CE described above.

According to Example 1, three types of coordinate values including opposite edge positions, a width dimension, and a height on the above-described coordinate axes are measured as a deformed shape value of a raw pipe to be actually measured during operation. A commercially-available laser sensor usable for measuring a position and a length with a laser beam was used as an instrument for the measurement.

More specifically, in space between forming roll stands where a raw pipe is exposed and observable, a sensor was located to allow measurement within a required range in such a manner as to allow measurement of the positions of opposite edge portions from above in the width direction of the raw pipe, measurement of the positions of the opposite edge portions in a height direction viewed from a horizontal direction, and measurement of the position of the bottom of the raw pipe viewed from the horizontal direction.

Furthermore, in order to examine the state of implementation of each of the processes such as measurement of a deformed shape value using the measurement instrument, image processing on a sectional shape, and comparison with an ideal model, a commercially-available integrated profile sensor unit employing an optical cutting method for applying a line light source with a laser to an inspection target and scanning a surface of the inspection target with resultant reflected light, which is specifically a block-shape sensor unit including a light source, a light-receiving camera, a controller for control over measurement and image processing, and a computer integrated with each other, was arranged in the vicinity of the measurement instrument for measuring the above-described three types of deformed shape values.

If the integrated profile sensor unit is arranged horizontally, for example, reflected light resulting from reflection of a laser beam light emitted vertically from an end of a unit lower surface on a surface of a measurement target is received at a light-receiving sensor provided at the other end of the unit lower surface, and the reflected light is measured and subjected to image processing by a computer provided in the unit, thereby scanning the surface of the measurement target.

In this case, while the sensor unit is fixed, a raw pipe is moved to scan a surface of the raw pipe. An inner surface shape, an outer peripheral surface shape, and a sectional shape of the raw pipe are subjected to image processing using the above-described x-y-z axis coordinates to allow measurement of various dimensions or an outer peripheral length of the raw pipe.

More specifically, in space between stands where the raw pipe is exposed and observable, one to four block-shape profile sensor units were arranged at positions where an inner surface of the raw plate in the width direction can be viewed from above entirely or in equally divided three zones, and at positions where an outer peripheral surface of the raw pipe can be observed in equally divided three or four zones of the outer periphery from above, from a horizontal direction, and from below.

It was determined that coordinate values acquired from the laser sensor for recognizing the three types of coordinate values including opposite edge positions, a width dimension and a height of the raw plate, and coordinate values acquired from the profile sensor unit agree with each other.

In the existing pipe mill line, for measurement of forming load at a required stand, a load cell was installed at a bearing connected to a jack or between a base and the bearing, for example.

A laser position sensor installed between required stands on the pipe mill line, the profile sensor unit, and the load cell were connected to a dedicated computer (measurement sensor control CE) for handling measured data acquired by controlling operation of the sensor.

Moreover, in order to visualize the position of the raw pipe on the three-dimensional coordinates by handling the above-described three types of deformed shape values obtained by the measurement instrument, a dedicated computer (recognition CE) having image processing software was used to assume a sectional shape image of the raw pipe on the basis of these values.

In order to make comparison between the sectional shape of the raw pipe assumable by the recognition CE and a sectional shape of a model raw pipe according to an ideal model defined by the above-described analysis, a dedicated computer (comparison CE) having software for image comparison was used.

As shown in FIG. 17, according to Example, measured data from the measurement sensor is input to and processed in a dedicated computer (measurement sensor control CE) called a core engine (CE), the data is further input to a dedicated computer (recognition CE) responsible for a recognizing process, and is then connected to a dedicated computer (comparison CE) for making comparison with an ideal model. All the core engines (CEs) including the storage CE for storage of data, the learning CE, the operation CE, and the line/stand control CE described above are connected directly or indirectly through a different core engine to a dedicated computer (main engine ME) for controlling these core engines in an integrated manner and for giving directions to and controlling these core engines individually.

All these computers have configurations and performances comparable to each other and are connected to each other through a high-speed Ethernet. As a matter of course, an integrated configuration can be provided in which all of or required ones of the core engines including the main engine and also the storage device are arranged on the same substrate or in a rack shape to function in a similar way to a substrate configuration.

The description given herein is about the sectional shape of the raw pipe. On the other hand, an ideal model obtained from analysis result contains information about an outer peripheral surface shape, an inner peripheral surface shape, a vertical sectional shape, an outer peripheral length, forming load at each stand in a forming tool stand array, as described above. Thus, in defining a comparison target from an actually measured deformed shape value, an outer peripheral surface shape or a sectional shape can be selected appropriately, for example, in such a manner as to make comparison relatively easily for each forming step.

Next, on the basis of the deformed shape value of the raw pipe being formed measured by the above-described measurement sensor, the comparison CE makes comparison with data in the storage CE and then a forming process for the raw pipe is expected. This is also performed by a corresponding dedicated computer (expectation CE).

Various types of methods can be assumed for expectation of a forming process for a raw pipe being formed. Here, expectation of a forming process of initial threading at the start of operation will be described first. Information about the dimension and type of a forming target metal plate is input as an operation condition into the operation CE through the line/stand control CE. Next, the main engine ME gives a direction to retrieve correlation data according to an ideal model responsive to the dimension and type as the operation condition from the storage CE and to store the retrieved data into the operation CE. At the same time, the main engine ME transmits information about the current operation condition and the ideal model conforming to the condition to each of the other core engines.

As the operation CE contains the correlation data about the ideal model for the forming target metal plate, the operation CE gives this correlation data to the line/stand control CE, thereby allowing the line/stand control CE to adjust the position of a forming roll in each stand in a stand array of a pipe mill in line with information about a position of abutting contact with a raw pipe according to the ideal model defining the dimension and quality of the raw pipe.

During the initial threading, sequence operation is performed by which the positions of forming rolls are adjusted sequentially for corresponding steps before the passage through each of the stands including the entry guide EG, the breakdown stand BD, and the cluster stand CL, and then the rolls are placed on standby.

First, according to the correlation data in the ideal model for the forming target metal plate, the operation CE gives a direction to perform operation of placing the rolls at the entry guide EG on standby, and then placing the forming rolls at each stand of the breakdown stand BD on standby.

In addition to the information about the dimension and type of the forming target metal plate given from the operation CE, the recognition CE recognizes the three types of coordinate values including opposite edge positions, a width dimension, and a height of the raw plate collected in the measurement sensor control CE while the raw plate passes through the stands sequentially during the initial threading, and outputs an image in the form of data generated from a deformed shape value composed of these coordinate values.

The comparison CE makes comparison between the ideal model responsive to the dimension and type of the forming target metal plate and the data acquired by the recognition CE, and selects a plurality of models as equal or approximate models while giving degrees of approximation of such models. At the same time, the comparison CE further outputs a difference between data about the ideal model and data about the approximate model.

The plurality of models selected by the comparison CE includes an ideal model defining an equal dimension assumed by simulation, and additionally, may include an ideal model defining an equal dimension and a different type, and also an ideal model resulting from the above-described expectation model and a correction model obtained by a model generation core engine (CE) during operation in the past.

Next, the expectation CE expects a forming process for the raw pipe on the basis of the model provided by the comparison CE. If the model selected by the comparison CE is an ideal model defining an equal dimension and an equal type, the expectation CE expects that the same forming process will be followed in the future. If an ideal model defining an equal dimension and a different type is selected and if simulation has already been conducted to see a differing item in the type of the selected model and to see how a forming process differs as a result of the differing item, this model has already been learned. Thus, a difference in forming process can be expected in advance on the basis of the substance of the type difference. This naturally makes it possible to expect a model easily to be used as a target of approximation in constructing a forming process.

Even if simulation has not been conducted so the substance of the type difference has not been learned or causal relation has not been known, a forming process is still expected using a difference in the data from a different ideal model defining an equal dimension and a different type approximate to the known ideal model defining the equal dimension. The expectation is facilitated further if correction models in the past, analysis data about result of actual operation, and forming process data are accumulated in large quantities.

In the meantime, while the comparison CE sets multiple degrees of approximation and selects a model, the comparison CE may have no choice and may be obliged to select a similar model of a low degree of approximation. In this case, this model corresponds to an additional irregular model beyond the scope of assumption.

As an example, if the expectation CE expects that rolling of the raw plate will become more serious so forming will become difficult, the expectation CE transmits an operation direction to the main engine ME to interrupt the initial threading immediately, cut a raw plate corresponding to a tip of a steel plate coil, and perform the initial threading again. The main engine gives a routine direction to the line/stand control CE through the direction CE responsible for control/display to cut the raw plate and perform the initial threading again. At the same time, the main engine causes the operation CE to conduct analysis on result of actual operation, transmits result of the analysis to the learning CE, and causes the learning CE to learn and store the result.

It was possible to adjust the positions of forming rolls at respective stands sequentially for corresponding steps before the passage at each of the stands including the entry guide EG, the breakdown stand BD, the cluster stand CL, the fin-pass stand FP, and the squeeze stand SQ on the basis of an ideal model during the initial threading, to recognize the three types of coordinate values including opposite edge positions, a width dimension, and a height of the raw plate collected in the measurement sensor control CE during passage of the raw plate through the stands sequentially, and to assume a forming process unique to a raw pipe while being subjected to each process after implementations of the calculation steps performed by the recognition CE, the comparison CE, and the expectation CE.

In response to respective results from the recognition CE, the comparison CE, and the expectation CE, the selection CE selects a model to be used according to the expected forming process. The selection CE further makes determination as to whether operation is to be performed according to the selected model or whether the model is to be corrected.

If the selection CE determines that a correction model is necessary, the model generation CE generates a new correction model according to the expected forming process on the basis of the selected ideal model to provide information about an outer peripheral surface shape, an inner peripheral surface shape, a vertical sectional shape, an outer peripheral length, and forming load at each stand in a stand array and positional information about a forming roll.

As described above, using the expectation CE, the selection CE, and the model generation CE, the raw pipe subjected to the assumed unique forming process is provided with the generated correction model containing data about a correlation value between a deformed shape value necessary for making approximation to data about a correlation value according to an approximate ideal model and positional information about a forming roll.

The above-described operation was performed only through measurement of a deformed shape value using the laser sensor for recognizing the three types of coordinate values including opposite edge positions, a width dimension, and a height of a raw plate. Scanning data, specifically, data about an inner surface shape, an outer peripheral surface shape, and a sectional shape of a raw pipe, and various dimensions and an outer peripheral length of the raw pipe acquired from the profile sensor unit was used to examine the state of implementation of measurement of a deformed shape value using the measurement instrument and that of image processing on a sectional shape, and the state of implementation of each of the calculation processes including comparison with an ideal model, expectation, selection, and model generation.

Substance of operation in each step using a deformed shape value of a raw pipe acquired from the three types of coordinate values including opposite edge positions, a width dimension, and a height of a raw plate actually measured as a vertical sectional shape was checked in scanning data obtained by the above-described optical cutting method, and was determined to be effective also in terms of an outer peripheral surface shape, an inner peripheral surface shape, and an outer peripheral length. Thus, it was possible to realize automatic operation using only the laser position sensor that is inexpensive and easy to install.

While the profile sensor unit is expensive and requires space for installation, using the profile sensor unit makes it possible to directly measure data about an inner surface shape, an outer peripheral surface shape, and a sectional shape of a raw pipe, and various dimensions and an outer peripheral length of the raw pipe. Moreover, it was possible for the calculation step corresponding to the recognition CE or the calculation steps corresponding to the recognition CE and also the comparison CE to be performed by the computer of the sensor unit.

Moreover, it was determined that incorporating forming load at each stand in a forming tool stand array into a vertical sectional shape as a deformed shape value of a raw pipe largely increases the degrees of accuracy of the respective calculation steps performed by the recognition CE, the comparison CE, and the expectation CE.

Example 2

A 20-inch mill line is a newly built mill and is usable for manufacturing of round pipes and square pipes including those for construction and oil well pipes at the same stand line. Pipes intended to be manufactured extend over a wide range of dimensions, types, and shapes, and thermal processing can be performed on a welding bead portion or also on an entire pipe for increasing quality.

Specifically, regarding dimensions, 138 types are intended for round pipes with outer diameters from 177.8 to 508.0 mm and thicknesses from 4 to 15.9 mmn, 78 types from 150 to 400 mm are intended for regular square pipes with thicknesses from 4 to 15.9 mmn, and 116 types of 200×100, 175×125, 200×120 to 300×100, 250×200, 300×200 to 400×200, 400×300, and 450×350 are intended for rectangular pipes with thicknesses from 4 to 15.9 mmn. Regarding a material, various steel types are intended including those for construction and those for oil well pipes.

Figure 10:
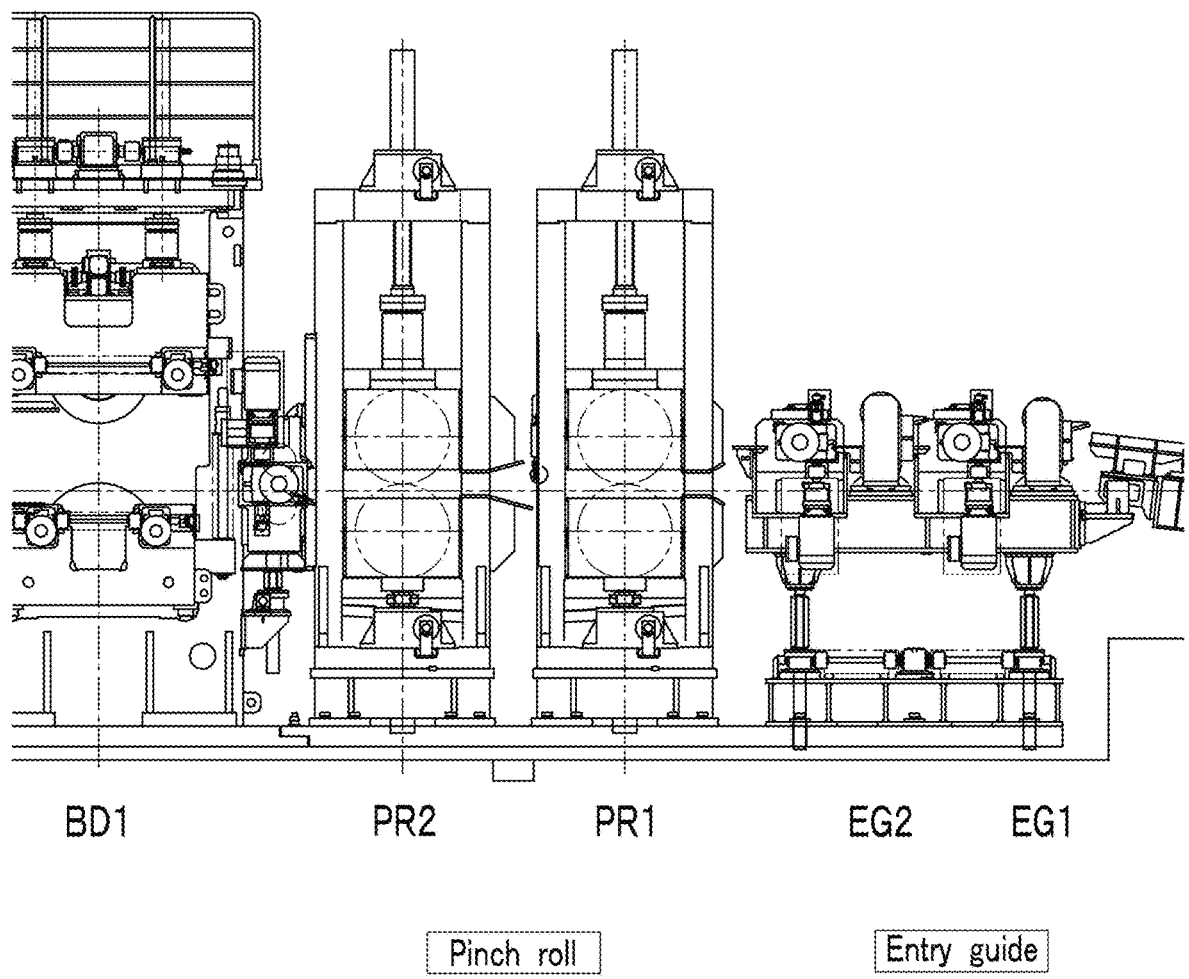
FIG. 10 is a side explanatory view of an upstream section of a pipe mill according to Example 2 taken from an operation side of a pass line direction and shows an entry guide stand EG corresponding to an entry side table and a pinch roll stand ER.
Figure 11:
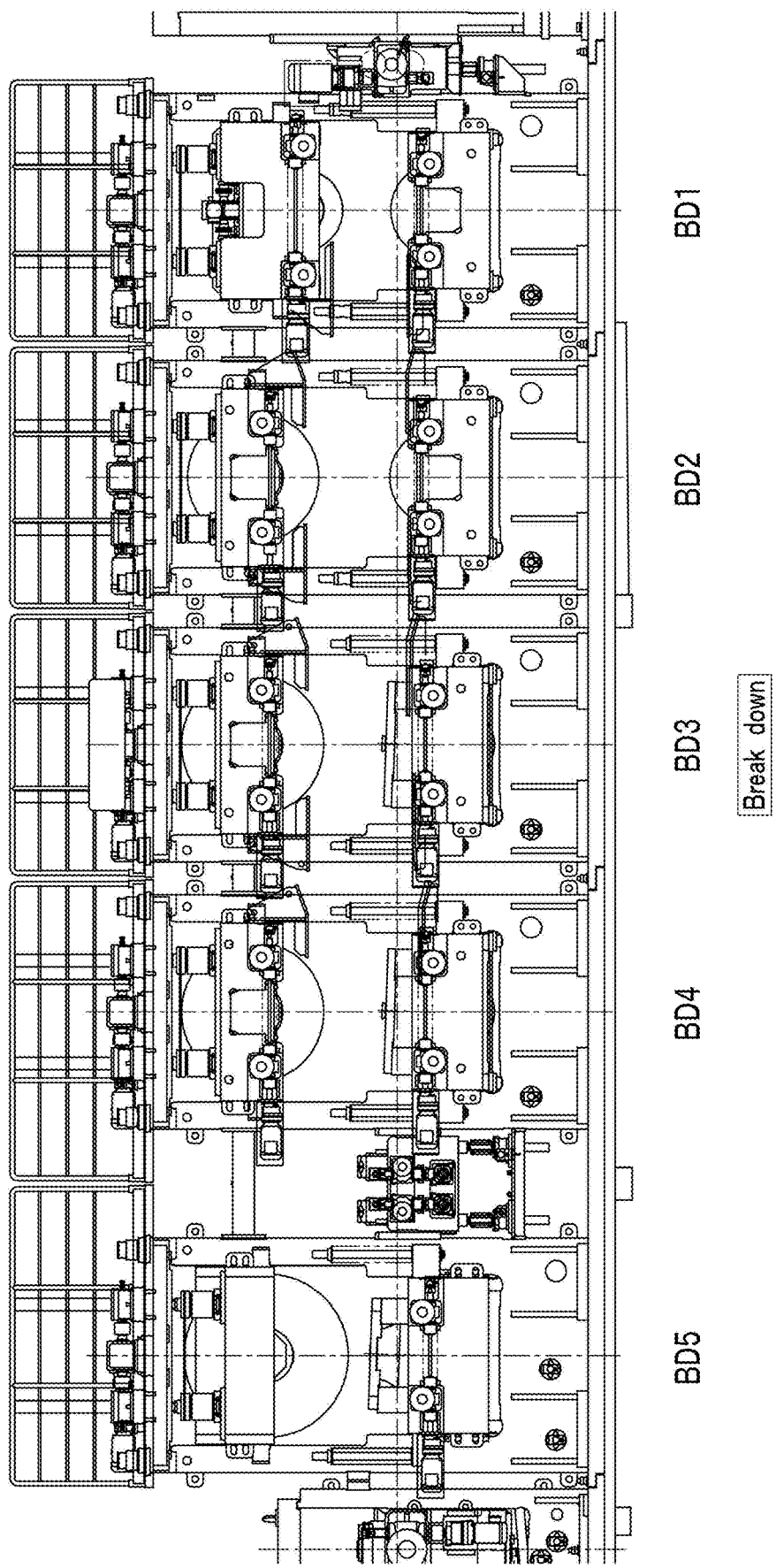
FIG. 11 is a side explanatory view of the upstream section of the pipe mill according to Example 2 taken from the operation side of the pass line direction and shows breakdown roll stands BD1 to BD5 in an initial forming section.
Figure 12:
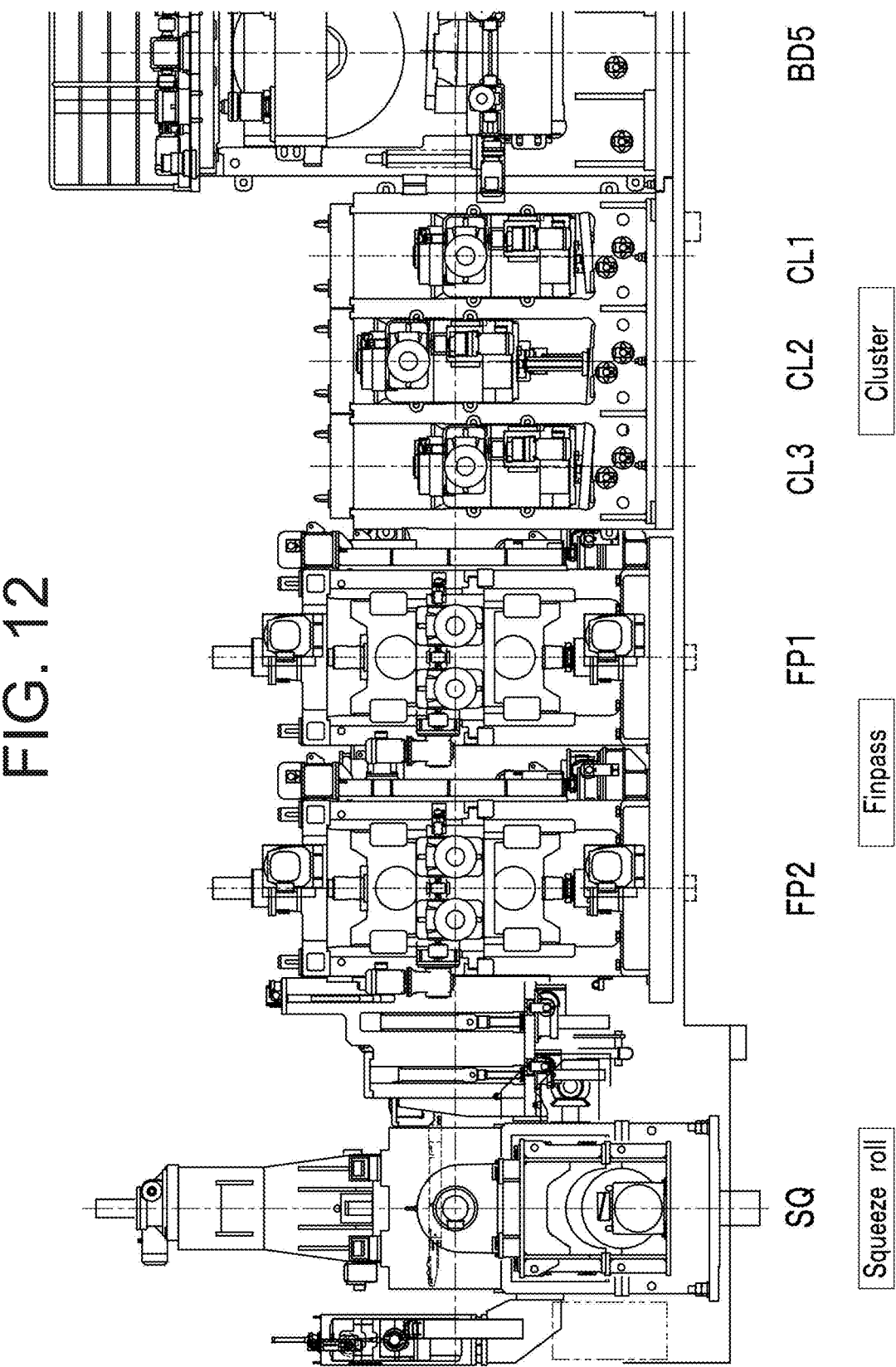
FIG. 12 is a side explanatory view of a posterior half of the upstream section of the pipe mill according to Example 2 taken from the operation side of the pass line direction and shows a cluster roll stand CL, a fin-pass roll stand FP, and a squeeze roll stand SQ in an intermediate forming section.

As shown in FIGS. 10 to 12, forming into a round pipe and welding are performed at a stand array including entry guide stands EG1 and EG2, pinch roll stand PR1 and PR2, breakdown stands BD1 to BD5, cluster roll stands CL1, CL2, and CL3, fin-pass roll stands FP1 and FP2, and a squeeze roll stand SQ arranged in this order as viewed from an upstream side. While not shown in the drawings, a downstream side from the squeeze roll stand SQ is a thermal processing section and has a line of a length of about 80 m including a heating zone and a cooling zone.

Figure 13:
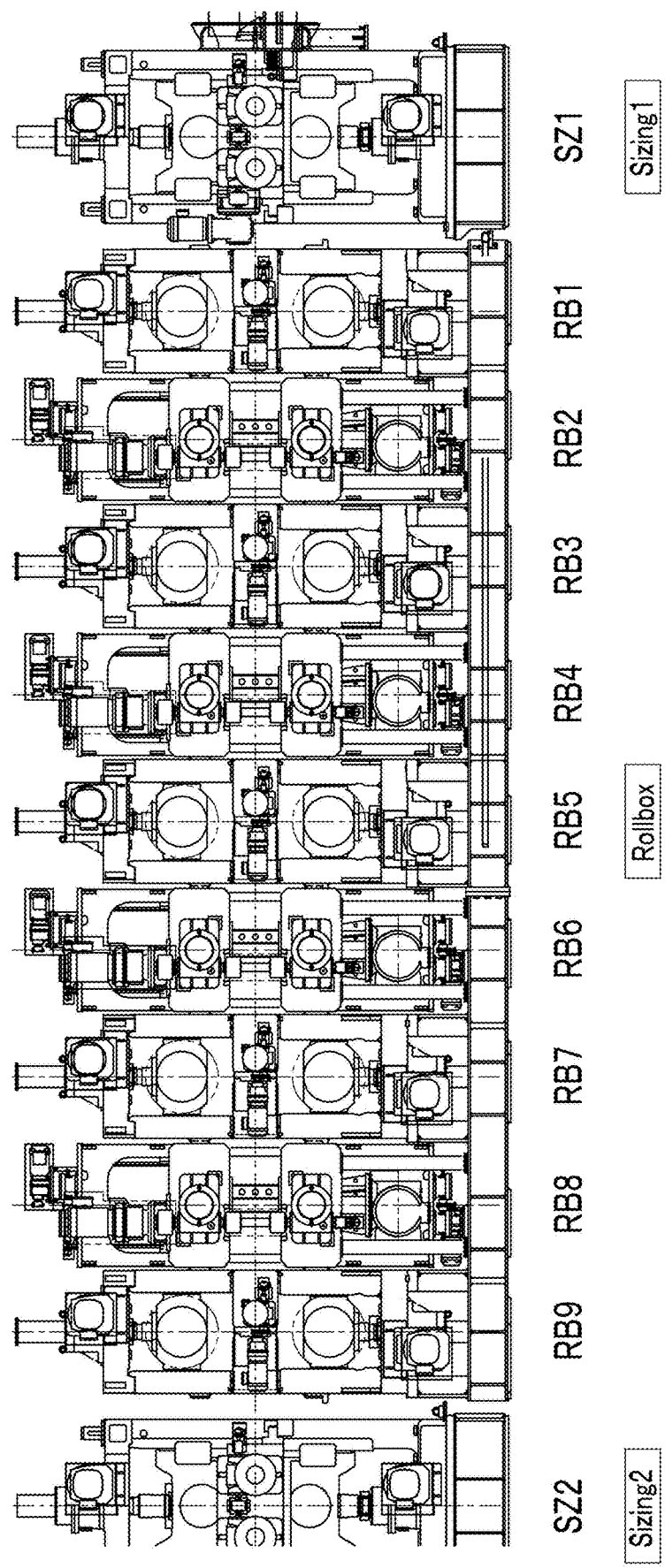
FIG. 13 is a side explanatory view of an anterior half of a downstream section of the pipe mill according to Example 2 taken from the operation side of the pass line direction and shows a sizing roll stand SZ used in a sizing/reshaping step for forming into a predetermined dimensional shape, a roll box stand RB for forming into a square pipe, and a Turk's head roll stand TH.
Figure 14:
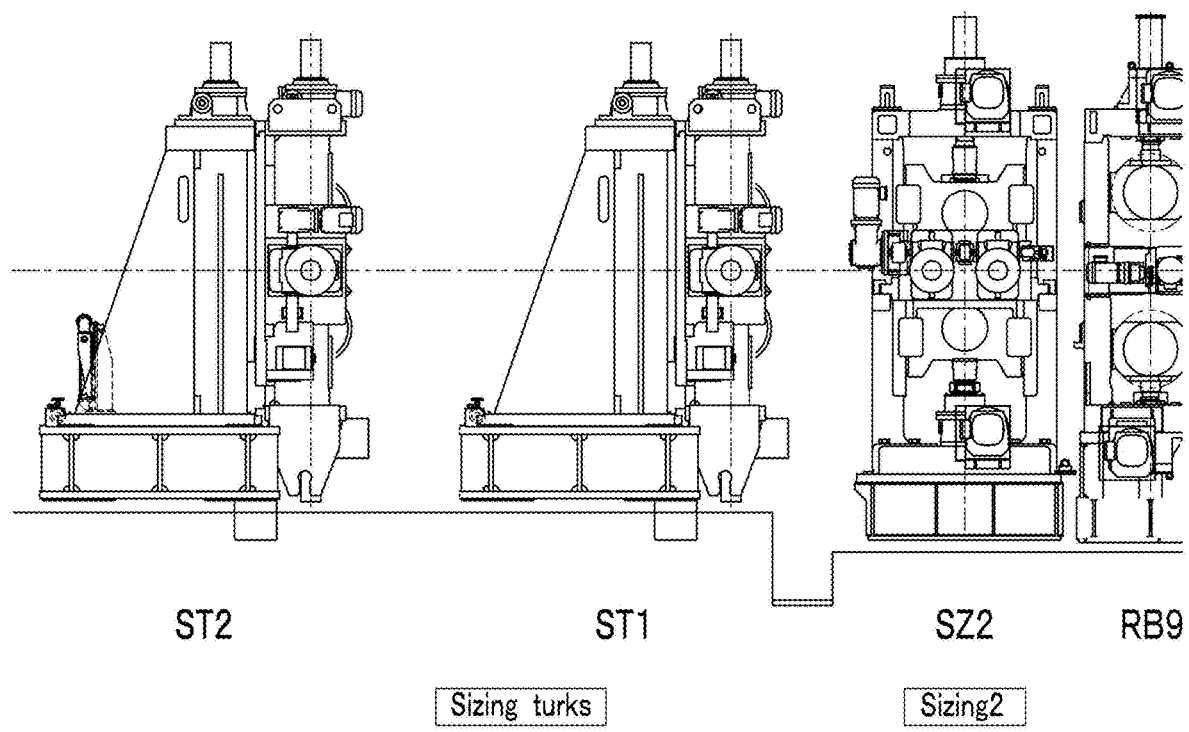
FIG. 14 is a side explanatory view of a posterior half of the downstream section of the pipe mill according to Example 2 taken from the operation side of the pass line direction and shows the sizing roll stand SZ used in the sizing/reshaping step for forming into a predetermined dimensional shape and a Turk's head roll stand TH.

As shown in FIGS. 13 and 14, a sizing stand SZ1, roll box stands RB1 to RB9 for forming from the round pipe into a square pipe, a sizing stand SZ2, Turk's head stands ST1 and ST2, a cutoff section arranged downstream from the Turk's head stands ST1 and ST2 for cutting the traveling pipe into a required length are provided after the thermal processing section.

In a configuration mentioned herein, the position of a forming roll in each stand is controlled electrically or hydraulically, for example, and roll position information can be input to and output from the line stand control CE.

A forming process is analyzed extensively using the above-described stand array in terms of the dimensions and materials of products including not only round pipes but also regular square pipes and rectangular pipes, and also in terms of the presence or absence of a thermal process. The analysis is conducted on a large number of models.

A measurement instrument for measuring a deformed shape value was installed appropriately along the stand line. A measurement sensor for measuring a deformed shape value uses a laser and a camera to acquire an outer surface shape of a raw pipe on the basis of measured opposite edge positions, width, and height of the raw pipe. Moreover, a load cell was installed to measure forming load at each stand.

An outer surface shape of a raw pipe and forming load at each stand are used as a deformed shape value. Operation basically the same as that of Example 1 was performed to manufacture a round pipe using common steel subjected to de-scaling using a brush.

As the used raw material is not a material from which scale is removed completely, soluble water was used at a required stand to spray mist onto a forming roll in response to need. This results in the presence of a stand at which measurement of an outer peripheral surface shape of the raw pipe is impossible due to the influence by the soluble water. In response to this, a load cell was installed at each stand to measure forming load.

Initial threading is performed in changing the dimension of a pipe product to be manufactured, for example. A forming roll in each stand is controlled to move to a required position in advance in response to the dimension or quality of the pipe product and is placed on standby waiting for arrival of the raw material or raw pipe. An outer peripheral surface shape of the raw pipe is measured and forming load at each stand is measured appropriately, comparison is made with an outer peripheral surface shape and forming load according to an ideal model for this product, and then correction is made automatically. As a result, the initial threading is completed easily and then an operation speed is increased sequentially to perform automatic operation for mass production.

If the round pipe is used as it is as a product, the roll box stands RB1 to RB9 function as a pathway for the round pipe.

The roll box stands RB1 to RB9 shown in FIG. 13 for forming of a round pipe into a square pipe is known publicly in Patent Literature 7 (EP 1815921B1). To facilitate roll multi-use, two-directional rolls are arranged alternately in a top-bottom direction and a right-left direction and in 9 stages in this case. A particular shape is employed for a roll surface to eliminate the need of roll changing during dimension changing of a product.

Specifically, in forming a round pipe as a raw pipe into a square pipe successively having a regular square section or a rectangular section using upper and lower forming rolls in a pair and right and left forming rolls in a pair with rotary axes located within a plane covering a section of the raw pipe, the curvature of the forming roll in a rotary axis direction along a surface of the forming roll is configured in such a manner that a raw pipe portion (shoulder intended portion) adjacent to a corner intended portion of the square pipe is linearized before the other raw pipe portion (other side intended portion). The curvature in the rotary axis direction along the forming roll surface is reduced continuously or stepwise from a position of restraining a raw pipe portion corresponding to the center of the side toward opposite external positions. By doing so, even if a roll is used commonly for forming of products of different sizes, it becomes possible for the raw pipe portion to become a shoulder to be linearized before the other portion.

As the particular shape is employed for the roll surface of the forming roll, it is important to make abutting contact of a required portion of the round pipe with a required position on the roll surface. At this time, predetermined load is required for exerting predetermined forming force and for generating necessary forming distortion.

For this reason, regarding simulation analysis on a forming process of forming from the round pipe into the square pipe using the two-direction rolls in 9 sets at the roll box stands RB1 to RB9, the analysis is conducted to see the position of a forming roll for exerting necessary forming force responsive to the dimension and type of the raw pipe and to see the application of forming reactive force to the forming roll resulting from forming distortion generated by position adjustment of the forming roll.

The forming reactive force applied to the forming roll can be measured as forming load by installing a load cell on a roll axis in a roll stand, for example. This also applies to the above-described breakdown stand.

In the meantime, during the forming at the roll box stand that is the forming from the round pipe into the square pipe, scale on a surface of the raw pipe is removed in quantity incomparably larger than that during the forming from the plate into the round pipe. In response to this, a large amount of soluble is used for removing the scale for the purpose of preventing wear of the forming roll or the occurrence of a recess in the raw pipe caused by the scale adhering to the roll surface, for example. This makes it extremely difficult to measure the surface shape of the raw pipe using a laser beam and a camera or decreases measurement accuracy.

In response to this, during forming into the square pipe at the roll box stand, the shape of the raw pipe was expected by a method using values of forming load at the two-direction rolls in 9 sets arranged horizontally and vertically measured by load cells.

Simulation analysis was conducted in advance on a forming process from round pipes of various dimensions and qualities into required square pipe using the roll box stand. This makes data about a correlation value known in advance between a pipe outer peripheral surface shape, positional information about the above-described forming roll, and forming load at this forming roll according to an ideal model for each of the stands RB1 to RB9. As this data can be compared with corresponding data about real forming, it is possible to estimate the shape of the raw pipe under actually measured forming load. This shape was estimated by a method using the deep learning CE having made a large number of shape estimations in advance.

Regarding forming into a square pipe at the roll box stand, using values of forming load at the two-direction rolls in 9 sets arranged horizontally and vertically, the shape of a raw pipe was expected, the expected shape was compared with a shape being formed according to an ideal model, a forming process for the raw pipe was expected, and a correction model for making approximation to the ideal model was generated. By doing so, it was possible to make position adjustment of a forming roll necessary for achieving this forming process. A dimension is determined finally at the Turk's head stand.

Example 3

Figure 15A:
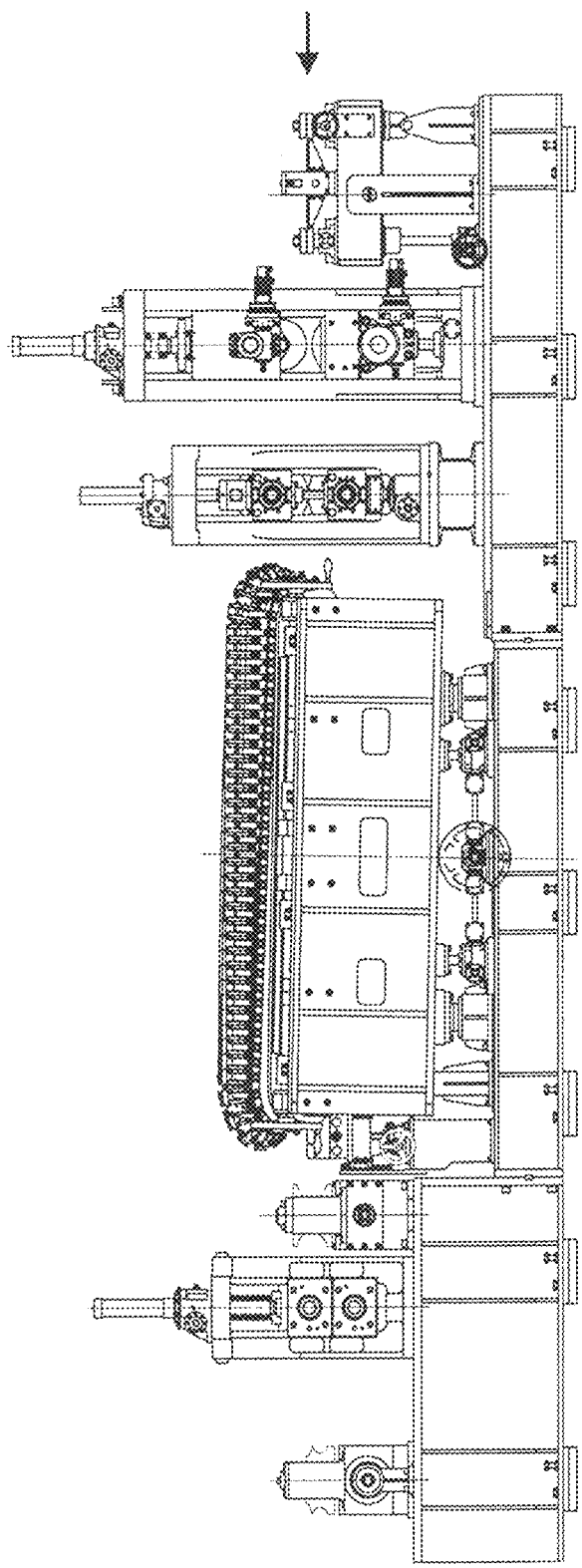
FIG. 15A is a side explanatory view of a pipe mill according to Example 3 taken from an operation side of a pass line direction and shows an entry guide stand EG corresponding to an entry side table, a forming machine ODF with a mold forming tool for continuity between an initial forming section and an intermediate forming section, a fin-pass roll stand FP, and a squeeze roll stand SQ.
Figure 15B:
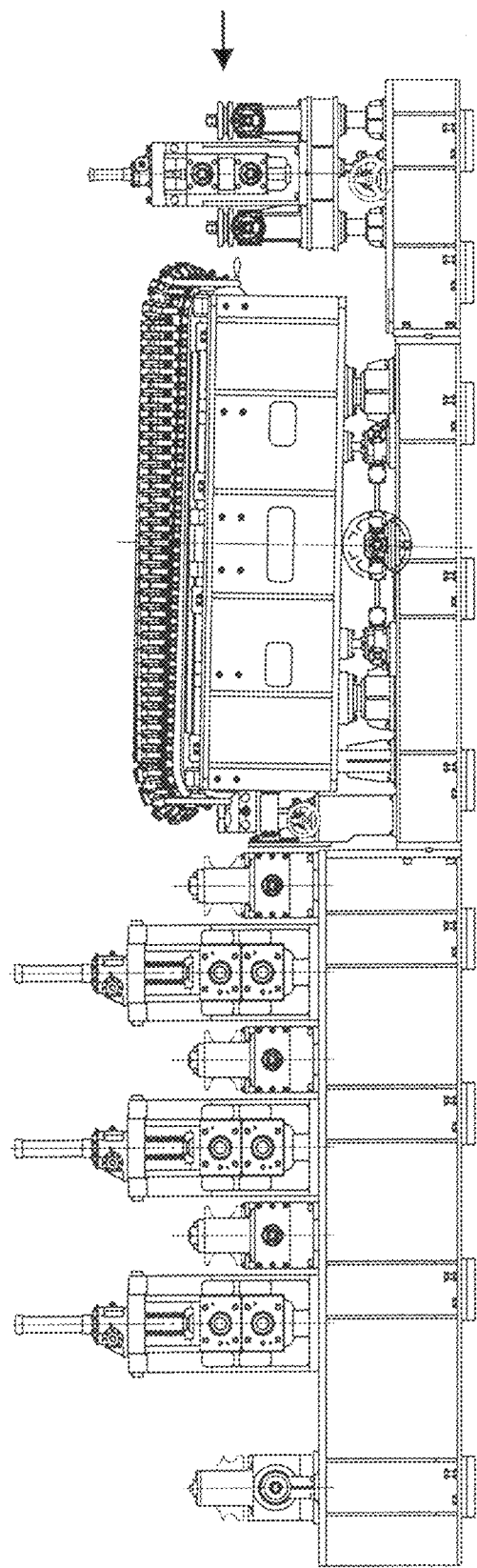
FIG. 15B is a side explanatory view of the pipe mill according to Example 3 taken from the operation side of the pass line direction and shows the entry guide stand EG corresponding to the entry side table, the forming machine ODF with the mold forming tool for continuity between the initial forming section and the intermediate forming section, the fin-pass roll stand FP, and the squeeze roll stand SQ.

A stand line shown in each of FIGS. 15A and 15B includes a forming machine disclosed in Patent Literature 10 (orbiter die forming machine (ODF)) as a main unit. The ODF unit as a single device can be used for completing the forming performed in Example 2 using the breakdown stand and the cluster roll stand.

The ODF unit is a forming device including:

a turning unit having an angle control mechanism that allows a die array as an endless array formed by connecting a plurality of dies in a turning direction each having an outward-pointed forming caliber and arranged in a swingable manner to turn in such a manner as to movable along an endless track, and changes and maintains a swinging angle of the forming caliber of each die;

a configuration in which the turning units in a pair are arranged in facing positions, a forming target raw material is allowed to get in between the facing forming calibers of these turning units, and a forming zone is defined along a linear or substantially linear orbit zone of a required length along which opposite end portions of the raw material in a width direction is restrained at the respective forming calibers continuously moving in synchronization with each other; and a mechanism by which, during passage of the forming target raw material through the forming zone, forming of the forming target raw material proceeds while the above-described swinging angle of the forming caliber of each die in abutting contact with an edge portion of the forming target raw material is changed at a change rate according to an angle change pattern (for achieving smooth continuity between the calibers of front and back dies) responsive to a forming step set in advance, for example, by causing the control mechanism to follow a copy orbit juxtaposed to the above-described orbit.

In order to receive forming reactive force during bending while arranging the turning units in a pair in facing positions and restraining opposite edges of a forming target raw material and in order to control a forming amount distribution appropriately responsive to a turning angle of each die as viewed in a traveling direction of the turning unit, a large number of lower rolls are necessary as support rolls for supporting a central portion of the width of the forming target raw material in the forming zone from below while abutting on this central portion. As the lower rolls, a large number of small-diameter rolls with recessed surfaces conforming to a curvature at a pipe bottom or two-split rolls composed of small-diameter rolls split into two in a width direction and having different orientations of the abutting contact are arranged in a traveling direction. Each of the lower rolls is adjustable in position.

Thus, adjusting the positions of the turning units in a pair facing each other, tilt angles of the turning units, and the positions of the lower rolls makes it possible to manufacture round pipes of various types of calibers.

A stand configuration of the pipe manufacturing line shown in FIG. 15A is applied to a case of a double bending forming system. With a right side of the drawing defined as an entry side, the stand configuration first includes an entry guide stand EG composed of a grooved side roll for feeding a forming target raw material in a row plate state, and also includes an edge bending stand EB composed of upper and lower rolls for forming opposite edge portions of the forming target raw material into a required arc-like shape, a reverse bending stand RVS composed of upper and lower rolls for reverse bending a central portion of a plate width lifted by the edge bending stand EB, a forming machine ODF stand composed of turning units in a pair responsible for a breakdown step of forming from a plate shape into a substantially circular shape, a fin-pass roll stand FP composed of upper and lower rolls for fixing a shape at an edge end surface and an entire shape of a section in preparation for welding after completion of the breakdown step, and a fin-pass side roll stand FPS composed of a side roll in a former stage of the fin-pass roll stand FP. In a final stage, a squeeze roll stand SQ for welding is provided where TIG welding is employed.

The ODF stand includes a large number of lower roll units and a side roll unit on an exit side.

A stand configuration of the pipe manufacturing line shown in FIG. 15B is applied to a case of a circular bending forming system. With a right side of the drawing defined as an entry side, the stand configuration first includes an entry guide stand EG composed of upper and lower pinch rolls and a grooved side roll for feeding a forming target raw material in a row plate state, and also includes a forming machine ODF stand composed of turning units in a pair responsible for a breakdown step entirely, a fin-pass roll stand FP composed of upper and lower rolls for completing the breakdown step, forming opposite edge portions of the forming target raw material into a required arc-like shape, and fixing a shape at an edge end surface and an entire shape of a section in preparation for welding, and fin-pass side roll stands FPS in three sets in total of six stages composed of side rolls in a former stage of the fin-pass roll stand FP. In a final stage, a squeeze roll stand SQ for welding is provided where high-frequency welding is employed. The ODF stand further includes a lower roll unit and a side roll unit.

The forming machine ODF stand is used for manufacturing pipes of a wide range of dimensions, qualities, and shapes for which soluble is basically not used including pickled common steel, stainless steel materials, and also particular materials such as titanium, copper material, aluminum alloy, etc.

Using a stand configuration of a pipe manufacturing line including the above-described ODF as a main unit, simulation analysis was conducted many times on a forming process for the above-described raw materials. In particular, at the ODF stand, the position of a lower roll along a section of a curved portion supported by caliber dies in a pair for restraining edge portions of a raw pipe and by the lower roll, and a sectional shape of the raw pipe are significant parameters.

For shape measurement of a forming raw material in the forming machine ODF stand composed of the turning units in a pair, the shape measurement method for measuring an inner peripheral surface of a raw pipe disclosed in Patent Literature 11 was employed.

Figure 16:
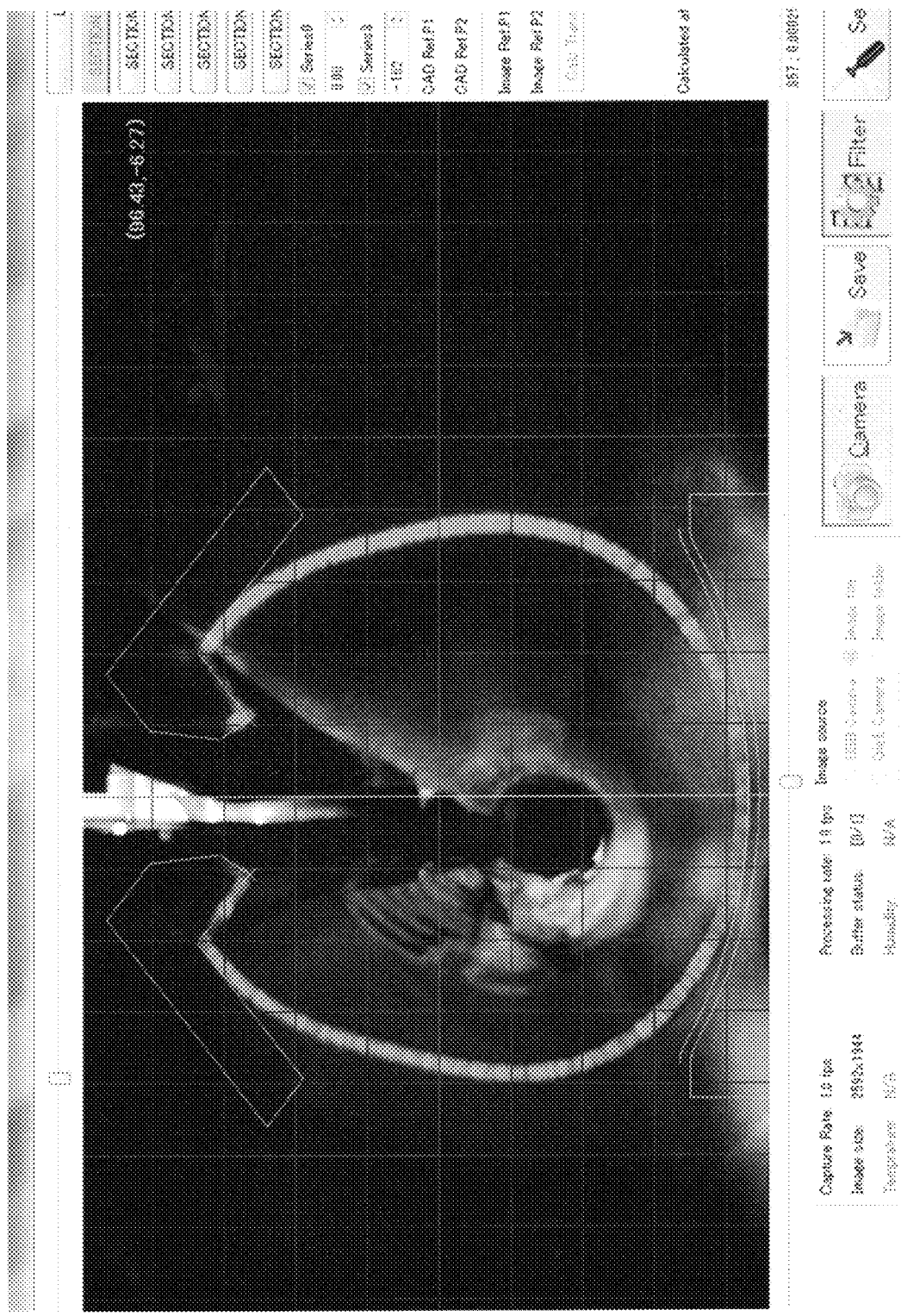
FIG. 16 is an explanatory view of a measuring method showing a visualized inner shape of a raw plate according to Example 3.

A ring-like laser light irradiator and a CCD camera were used as measurement sensors. Ring light beams having the same vertical section are emitted into a curved portion defined by curving opposite edge portions of a raw plate while restraining the opposite edge portions with a die array in the turning units in a pair, an image of reflected light from an inner peripheral surface of the curved portion is captured using the CCD camera located upstream from a position of emission of the ring light, resultant captured data is subjected to image processing to measure the shape of the inner peripheral surface, and resultant measured data is used to estimate a sectional shape of the raw pipe as shown in FIG. 16.

The stand configuration of the pipe manufacturing line shown in FIG. 15B is as has been described above. During simulation on a forming process, a continuous raw pipe is formed into an integrated formed object at all the stands including the entry guide stand EG, the ODF stand, the fin-pass side roll stand FPS, the fin-pass roll stand FP, and the squeeze roll stand SQ. Positional information about various types of forming tools, inner and outer peripheral surface shapes of the raw pipe at the position of each forming tool, and forming reactive force received by the forming tool are analyzed and judged as an ideal model.

During actual operation, the above-described measurement of an inner surface shape of a raw pipe was made and a sectional shape of the raw pipe was measured through image processing at the ODF stand. In a place downstream from the ODF stand, forming load at each stand was measured using a load cell to estimate an outer peripheral surface shape of the raw pipe on the basis of a load value. Furthermore, an edge position, a width, and a height of the raw pipe were measured with laser light between the fin-pass side roll stand FPS and the fin-pass roll stand FP to measure an outer peripheral surface shape.

The ODF stand composed of the turning units in a pair is a device capable of bending a raw plate like a press while restraining opposite ends of the raw plate continuously. Thus, if the raw plate has an ideal shape or quality, forming of this raw plate is completed easily. In actual cases, however, restraint at the opposite ends may become insufficient according to a raw material, so that it becomes necessary to adjust the position of a lower roll or that of a side roll on an exit side.

If this work is done by an operator while the operator sees an image obtained by measurement of the inner surface shape, productivity is not improved as making adjustment takes a long time and adjustment is necessitated each time a raw material is changed.

A forming process using the pipe manufacturing line shown in FIG. 15B was simulated in advance with different product dimensions and qualities to obtain a sectional shape of a raw pipe being formed at the ODF stand according to an ideal model and an outer peripheral surface shape at the fin-pass roll stand FP. Moreover, simulation was conducted on a forming process according to an individuality model containing an assumed difference in individuality between raw materials to acquire data about a correction model for making approximation to the ideal model.

Such data was accumulated using the deep learning CE having generated a large number of correction models in advance.

As described above, by measuring a sectional shape of a raw pipe being formed at the ODF stand and an outer peripheral surface shape at the fin-pass roll stand FP during actual operation, a forming process was expected. By doing so, it was possible to adjust the position of a lower roll at the ODF stand or that of a side roll on an exit side automatically in response to need.

INDUSTRIAL APPLICABILITY

The present invention provides a smart mill that achieves forming while optimizing the position of a forming tool automatically to be used for the forming simply by measuring an edge position, a height, and a width of a raw material during the forming and also simply by measuring forming load at a forming stand at the time of initial threading of a metal plate into a manufacturing apparatus for manufacturing a metal pipe from a metal plate (strip) by the forming using a forming tool such as a roll or changing of the dimension of the metal plate.

REFERENCE SIGNS LIST

EG Entry guide stand
PR Pinch roll stand
BD Breakdown roll stand
CL Cluster roll stand FP Fin-pass roll stand
SQ Squeeze roll stand
SZ Sizing roll stand
TH Turk's head roll stand
CE Core engine

The invention claimed is:

1. A manufacturing method for a metal pipe for forming into a metal pipe through a pipe manufacturing step, a welding step, and a sizing/reshaping step, the pipe manufacturing step forming a metal strip material from a plate shape into a semi-circular cylindrical shape and further into a substantially circular cylindrical shape continuously in each forming step including a breakdown step, a cluster step, and a fin-pass step using a forming mill configured by arranging a plurality of forming tool stands in a line direction in which the metal strip material travels, the forming tool stand being configured by arranging a plurality of forming tools in the stand to form a required forming caliber allowing the material to pass therethrough, the welding step welding opposite end portions of the material in a width direction to each other by forming a butting contact therebetween, the sizing/reshaping step forming the material into a pipe having a required caliber and required straightness, the manufacturing method using:

a stand array line in which some or each of the forming tools used in each of the steps is held in a corresponding stand across position adjusting means allowing position adjustment of the forming tool relative to a forming target metal strip material (raw plate/raw pipe) using adjusted positional information on three-dimensional coordinates determined by defining a pass line (x-axis direction) as a horizontal plane covering a traveling direction (z-axis direction) of the material set in advance and a line center (y-axis direction) as a plane vertical to the pass line, and a forming mill in each of the steps composed of a forming tool stand available for forming the required forming caliber is arranged in the line direction in which the material travels, and in which a measurement sensor is arranged that allows measurement of a deformed shape value of the raw pipe containing at least any one of an outer peripheral surface shape, an inner peripheral surface shape, a vertical sectional shape, an outer peripheral length, and forming load at each stand in a forming tool stand array, the raw pipe being at a position identified on the three-dimensional coordinates in the vicinity of a forming tool in a required stand;

storage means, after implementation of a step targeted for part or whole of the stand array line of conducting simulation analysis in advance on a course of forming from the metal plate into the metal pipe using the forming tool as forming processes in which a relative positional relation between the metal material itself during elastoplastic deformation of the material and the forming tool is grasped as a relation on the three-dimensional coordinates, and conducting simulation analysis on the course of forming as forming processes according to various types of ideal models on the basis of different dimensions or types of various metal plates, and after implementation of a step of acquiring forming process data defining a correlation value at each or a particular forming tool stand in the stand array line targeted for the analysis between the deformed shape value of the raw pipe at an identified position on the three-dimensional coordinates in the vicinity of the forming tool in each stand and positional information about the three-dimensional coordinates of the forming tool in each stand on the basis of result of the simulation analysis on the forming processes according to the various types of ideal models on the basis of different dimensions or types of various metal plates, the storage means storing the various types of forming processes in advance acquired through the simulation analysis as the forming process data about a correlation value according to the various types of ideal models between a deformed shape value of the raw pipe and a forming tool position; and output means, by using calculation means that performs a measurement step of measuring a deformed shape value of the raw pipe being formed using the measurement sensor provided in the required stand or along the line during real operation using the stand array line targeted for the analysis, and then makes comparison with the forming process data according to the ideal models in the storage means and expects a forming process for the forming target raw pipe and data about the forming process on the basis of a deformed shape value of the raw pipe being formed that is measured by the measurement step, and information about the dimension or about the dimension and type of the forming target metal plate during the real operation, the output means expecting data about a forming process unique to the forming target raw pipe during implementation of the real operation using the stand array line targeted for the analysis, selecting stand positional information about a forming tool necessary for implementation of the expected unique forming process, and outputting adjusted positional information about a forming tool in the stand required to be adjusted, thereby performing the unique forming process.

2. The manufacturing method for a metal pipe according to claim 1, wherein
the manufacturing method uses line automatic control means that controls the position adjusting means for position adjustment of the forming tool in the stand required to be adjusted in position in response to output of the positional information about the forming tool.

3. The manufacturing method for a metal pipe according to claim 1, wherein
pipe manufacturing is started after a mechanical descaling process is performed on any of an entire surface, an outer peripheral intended surface, and an inner peripheral intended surface, or part of these surfaces of the metal plate as a raw material before forming, and during a step of the pipe manufacturing, lubrication of spraying a water-insoluble lubricant onto the metal plate or the forming tool is performed in response to need without using a water-soluble lubricant.

4. The manufacturing method for a metal pipe according to claim 1, wherein
a three-dimensional elastoplastic FEM analysis method is used in the simulation analysis.

5. The manufacturing method for a metal pipe according to claim 1, wherein
the deformed shape value of the raw pipe is an outer peripheral surface shape or an inner peripheral surface shape acquired from opposite edge positions and a width dimension of the raw pipe observed on the pass line and a height of the raw pipe observed on the line center plane on the three-dimensional coordinates.

6. The manufacturing method for a metal pipe according to claim 1, wherein
the deformed shape value of the raw pipe is a vertical sectional shape acquired from opposite edge positions and a width dimension of the raw pipe observed on the pass line plane and a height of the raw pipe observed on the line center plane on the three-dimensional coordinates.

7. The manufacturing method for a metal pipe according to claim 5, wherein
the deformed shape value of the raw pipe is also a value obtained by incorporating forming load at each stand in the forming tool stand array.

8. The manufacturing method for a metal pipe according to claim 6, wherein
the deformed shape value of the raw pipe is also a value obtained by incorporating forming load at each stand in the forming tool stand array.

9. The manufacturing method for a metal pipe according to claim 1, wherein
the calculation means, which makes comparison with the forming process data in the storage means and expects the forming process for the raw pipe on the basis of the measured deformed shape value of the raw pipe being formed, calculates a correction model prepared for data about the assumed unique forming process and containing forming process data containing a correlation value between a deformed shape value necessary for making approximation to data about a forming process according to a selected ideal model and positional information about the forming tool, and uses line automatic control means that adjusts the position of a forming tool in a stand required to be adjusted in position on the basis of the data for implementation of the forming process according to the correction model.

10. The manufacturing method for a metal pipe according to claim 9, wherein
the correction model is calculated by a method using machine learning technique.

11. The manufacturing method for a metal pipe according to claim 9, wherein
the correction model is calculated by a method using deep learning technique.

12. The manufacturing method for a metal pipe according to claim 9, wherein
the data about the correlation value between the deformed shape value and the positional information about the forming tool contained in the correction model calculated by the calculation means is stored in a storage device as data about a correlation value of a learned model relating to a metal plate of an additional unique dimension or also of an additional unique type and is used as stored data.

13. A manufacturing apparatus for a metal pipe for forming into a metal pipe through a pipe manufacturing step, a welding step, and a sizing/reshaping step the pipe manufacturing step forming a metal strip material from a plate shape into a semi-circular cylindrical shape and further into a substantially circular cylindrical shape continuously in each forming step including a breakdown step, a cluster step, and a fin-pass step using a forming mill configured by arranging a plurality of forming tool stands in a line direction in which the metal strip material travels, the forming tool stand being configured by arranging a plurality of forming tools in the stand to form a required forming caliber allowing the material to pass therethrough, the welding step welding opposite end portions of the material in a width direction to each other by forming a butting contact therebetween, the sizing/reshaping step forming the material into a pipe having a required caliber and required straightness, the manufacturing apparatus comprising:
a stand array line in which some or each of the forming tools used in each of the steps is held in a corresponding stand across position adjusting means allowing position adjustment of the forming tool relative to a forming target metal strip material (raw plate/raw pipe) using adjusted positional information on three-dimensional coordinates determined by defining a pass line (x-axis direction) as a horizontal plane covering a traveling direction (z-axis direction) of the material set in advance and a line center (y-axis direction) as a plane vertical to the pass line, and a forming mill in each of the steps composed of a forming tool stand available for forming the required forming caliber is arranged in the line direction in which the material travels, and in which a measurement sensor is arranged that allows measurement of a deformed shape value of the raw pipe containing at least any one of an outer peripheral surface shape, an inner peripheral surface shape, a vertical sectional shape, an outer peripheral length, and forming load at each stand in a forming tool stand array, the raw pipe being at a position identified on the three-dimensional coordinates in the vicinity of a forming tool in a required stand;

storage means,
the storage means including a step targeted for part or whole of the stand array line of conducting simulation analysis in advance on a course of forming from the metal plate into the metal pipe using the forming tool as forming processes in which a relative positional relation between the metal material itself during elastoplastic deformation of the material and the forming tool is grasped as a relation on the three-dimensional coordinates, and conducting simulation analysis on the course of forming as forming processes according to various types of ideal models on the basis of different dimensions or types of various metal plates, and a step of acquiring forming process data defining a correlation value at each or a particular forming tool stand in the stand array line targeted for the analysis between the deformed shape value of the raw pipe at an identified position on the three-dimensional coordinates in the vicinity of the forming tool in each stand and positional information about the three-dimensional coordinates of the forming tool in each stand on the basis of result of the simulation analysis on the forming processes according to the various types of ideal models on the basis of different dimensions or types of various metal plates, the storage means storing the various types of forming processes in advance acquired through the simulation analysis as the forming process data about a correlation value according to the various types of ideal models between a deformed shape value of the raw pipe and a forming tool position;

calculation means,
the calculation means including a measurement step of measuring a deformed shape value of the raw pipe being formed using the measurement sensor provided in the required stand or along the line during real operation using the stand array line targeted for the analysis, the calculation means making comparison with the forming process data according to the ideal models in the storage means and expecting a forming process for the forming target raw pipe and data about the forming process on the basis of a deformed shape value of the raw pipe being formed that is measured by the measurement step and information about the dimension or about the dimension and type of the forming target metal plate during the real operation; and output means, the output means expecting data about a forming process unique to the forming target raw pipe during implementation of the real operation using the stand array line targeted for the analysis, selecting stand positional information about a forming tool necessary for implementation of the expected unique forming process, and outputting adjusted positional information about a forming tool in the stand required to be adjusted, thereby performing the unique forming process.

* * * * *